United States Patent
Zhang

(10) Patent No.: US 12,438,936 B2
(45) Date of Patent: Oct. 7, 2025

(54) FILE SHARING METHOD AND ELECTRONIC DEVICE

(71) Applicant: HONOR DEVICE CO., LTD., Shenzhen (CN)

(72) Inventor: Zhengke Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/711,003

(22) PCT Filed: Aug. 17, 2022

(86) PCT No.: PCT/CN2022/113030
§ 371 (c)(1),
(2) Date: May 16, 2024

(87) PCT Pub. No.: WO2023/103442
PCT Pub. Date: Jun. 15, 2023

(65) Prior Publication Data
US 2025/0016218 A1    Jan. 9, 2025

(30) Foreign Application Priority Data
Dec. 6, 2021  (CN) .......................... 202111511555.9

(51) Int. Cl.
*H04L 67/06*    (2022.01)
*H04L 67/141*   (2022.01)

(52) U.S. Cl.
CPC ............ *H04L 67/06* (2013.01); *H04L 67/141* (2013.01)

(58) Field of Classification Search
None
See application file for complete search history.

(56) References Cited

U.S. PATENT DOCUMENTS 7,624,188 B2 * 11/2009 Koskelainen ....... H04L 12/1827
                                                  709/227
9,563,365 B2 *  2/2017 Lenox .................... G06F 3/0611
(Continued)

FOREIGN PATENT DOCUMENTS

CN    101867559 A    10/2010
CN    103701853 A     4/2014
(Continued)

OTHER PUBLICATIONS

[No Author Listed] [online] "Thread (computing)—Wikipedia," available on or before Dec. 5, 2021, via Internet Archive: Wayback Machine URL<https://web.archive.org/web/20211205190816/https://en.wikipedia.org/wiki/Thread_(computing)>, retrieved on Dec. 2024, 10 pages.

(Continued)

*Primary Examiner* — Quang N Nguyen
(74) *Attorney, Agent, or Firm* — Fish & Richardson P.C.

(57) ABSTRACT

Embodiments of this application provide a file sharing method and an electronic device. The method is applied to a first electronic device, and includes: displaying a first interface including an identifier of a second electronic device; establishing a communication connection to the second electronic device when receiving a first operation that is on the first interface and that is performed by a user on the identifier of the second electronic device, where the second electronic device is configured to receive multiple to-be-shared files sent by the first electronic device; sequentially compressing a preprocessing-type file in the multiple to-be-shared files to obtain a compressed file; and sending a direct-sending-type file in the multiple to-be-shared files and the obtained compressed file to the second electronic device through a data channel corresponding to the communication connection.

20 Claims, 21 Drawing Sheets

(56) References Cited

U.S. PATENT DOCUMENTS

| | | | |
|---|---|---|---|
| 11,249,635 B2 | 2/2022 | Ye | |
| 12,032,528 B2 | 7/2024 | Ha et al. | |
| 12,224,986 B2 * | 2/2025 | Wang | H04L 63/0263 |
| 2005/0262249 A1 * | 11/2005 | Koskelainen | H04L 65/403 |
| | | | 709/229 |
| 2015/0281292 A1 | 10/2015 | Murayama et al. | |
| 2019/0199832 A1 | 6/2019 | Maeda | |
| 2020/0257425 A1 | 8/2020 | Ye | |
| 2022/0179827 A1 | 6/2022 | Liu | |

FOREIGN PATENT DOCUMENTS

| | | |
|---|---|---|
| CN | 108566328 A | 9/2018 |
| CN | 109327522 A | 2/2019 |
| CN | 111327517 A | 6/2020 |
| CN | 111327765 A | 6/2020 |
| CN | 112363988 A | 2/2021 |
| CN | 112445762 A | 3/2021 |
| CN | 112532724 A | 3/2021 |
| CN | 113542337 A | 10/2021 |
| EP | 3506097 B1 | 3/2020 |
| JP | 2002073451 A | 3/2002 |
| WO | 2019071872 A1 | 4/2019 |

OTHER PUBLICATIONS

Notice of Allowance in European Appln. No. 22902876.6, mailed on Jul. 16, 2025, 7 pages.

* cited by examiner

| File type | File format | Quantity of files | File size (MB) | Compression time (ms) | Main memory usage for compression (MB) | Compression size (MB) | Decompression time (ms) | Main memory usage for decompression (MB) | File compression ratio (%) | Suggestion |
|---|---|---|---|---|---|---|---|---|---|---|
| Executable file | exe | 6 | 10.2 | 453 | 3.84 | 3.91406 | 110 | 10.3281 | 62.6 | Compression |
| | txt | 1 | 45.6 | 211.1 | 0.4004 | 0.362787 | 73.5 | 46.0297 | 99.2 | Compression |
| | ppt | 3 | 13.3 | 453 | 13.3867 | 13.28 | 78 | 13.3672 | 0.41 | Direct sending |
| Document file | excel | 8 | 44.4 | 1438 | 38.4297 | 38.23 | 344 | 44.418 | 14 | Compression |
| | word | 1 | 57.2 | 1625 | 57.0625 | 57 | 140 | 57.2734 | 0.376 | Compression |
| | pdf | 1 | 10 | 265 | 8.70313 | 8.6477 | 78 | 10.0586 | 13.577 | Direct sending |
| | png | 2 | 95.7 | 2375 | 31.1914 | 31.11277 | 640 | 95.7461 | 67.47 | Direct sending |
| Graphic file | jpg | 1 | 8.84 | 329 | 8.90234 | 8.847 | 46 | 8.94531 | 0 | Direct sending |
| | bmp | 16 | 114 | 1078 | 3.21484 | 3.1192 | 797 | 114.695 | 97 | Compression |
| Audio file | mp4 | 1 | 10.6 | 360 | 10.2891 | 10.23364 | 109 | 10.707 | 3.94 | Direct sending |
| | mp3 | 2 | 9.16 | 9.07422 | 9.0137 | 109 | 110 | 9.19141 | 1.71 | Direct sending |

FIG. 17

FILE SHARING METHOD AND ELECTRONIC DEVICE

CROSS-REFERENCE TO RELATED APPLICATIONS

This application is a national stage of International Application No. PCT/CN2022/113030, filed on Aug. 17, 2022, which claims priority to Chinese Patent Application No. 202111511555.9, filed on Dec. 6, 2021. The disclosures of both of the aforementioned applications are hereby incorporated by reference in their entireties.

TECHNICAL FIELD

This application relates to the field of electronic technologies, and specifically, to a file sharing method and an electronic device.

BACKGROUND

With continuous development of electronic technologies, electronic devices have increasing functions. For example, users can use the electronic devices to share files, in other words, send one or more files from one electronic device to another electronic device. For example, files are shared between mobile phones or between personal computers (personal computers, PCs).

Currently, when a user needs to send multiple files from one electronic device to another electronic device, the user performs a corresponding file sharing operation on the electronic device. After receiving the file sharing operation performed by the user, the electronic device usually sends the multiple to-be-shared files to the another electronic device one by one. This file sharing process is inefficient.

SUMMARY

This application provides a file sharing method and an electronic device, to improve efficiency of a file sharing process.

According to a first aspect, this application provides a file sharing method, where the method is applied to a first electronic device, and includes: displaying a first interface including an identifier of a second electronic device; establishing a communication connection to the second electronic device when receiving a first operation that is on the first interface and that is performed by a user on the identifier of the second electronic device, where the second electronic device is configured to receive multiple to-be-shared files sent by the first electronic device; sequentially compressing a first-type file in the multiple to-be-shared files to obtain a compressed file; and sending a second-type file in the multiple to-be-shared files and the obtained compressed file to the second electronic device through a data channel corresponding to the communication connection, where the first-type file and the second-type file are obtained by classifying the multiple to-be-shared files according to a preset classification policy, the first-type file is a file that needs to be compressed, and the second-type file is a file to be directly sent to the second electronic device.

Before the first electronic device sends the files to the second electronic device, it is necessary to first establish the communication connection between the first electronic device and the second electronic device. The first electronic device may provide the interface for establishing the communication connection, where the interface includes the identifier of the second electronic device. The first electronic device may be triggered through a click operation (namely, the first operation) on the identifier to establish the communication connection to the second electronic device. After the first electronic device establishes the connection to the second electronic device, the first electronic device may send the multiple to-be-shared files to the second electronic device. In this case, to improve sharing efficiency, the first electronic device may compress the first-type file (namely, a file that is obtained through classification and that needs to be compressed, that is, a preprocessing-type file) in the to-be-shared files, and then send the compressed file and the second-type file (namely, a file that is obtained through classification and that does not need to be compressed, that is, a direct-sending-type file) to the second electronic device. Optionally, the foregoing classification policy for classifying the to-be-shared files may be a policy for performing classification according to file sizes and/or file types of the to-be-shared files.

It should be noted that to reduce waiting time during file sending, the first electronic device may start compressing the first-type file in a process of establishing the communication connection to the second electronic device, so that the first electronic device directly sends the compressed file and the second-type file after successfully establishing the connection to the second electronic device. It should also be noted that the first electronic device and the second electronic device may be mobile phones, PCs, tablet computers, or the like. This implementation can implement file transfer between various devices.

In the foregoing implementation, the first electronic device may classify the to-be-shared files according to factors such as the types and the sizes of the multiple files, then compress and package a part of the multiple files, and send the other part of the files and the compressed file to another electronic device. This can reduce a data amount of the shared files, to improve the sharing efficiency.

With reference to the first aspect, in some implementations of the first aspect, the method further includes: creating a first thread and a second thread; the sequentially compressing a first-type file in the multiple to-be-shared files to obtain a compressed file includes: calling the first thread to sequentially compress the first-type file to obtain the compressed file; and the sending a second-type file in the multiple to-be-shared files and the obtained compressed file to the second electronic device includes: calling the second thread to send the second-type file and the obtained compressed file to the second electronic device, where execution by the first thread and the second thread are concurrent.

The first thread may be referred to as a compression thread, the second thread may be referred to as a sending thread, and the execution by the first thread and the second thread are concurrent. That is, while the first thread compresses the first-type file, the second thread may send the second-type file to the second electronic device, and also send the compressed file to the second electronic device after obtaining the compressed file.

With reference to the first aspect and the foregoing implementation, the first electronic device starts one compression thread to compress the first-type file, and then sends the compressed file and the second-type file to the target electronic device through the sending thread. This can reduce the data amount of the shared files, to improve the sharing efficiency. In addition, the concurrent execution by the two threads also improves the file sharing efficiency.

With reference to the first aspect, in some implementations of the first aspect, the method further includes: storing a storage address of the first-type file into a first queue; and the calling the first thread to sequentially compress the first-type file to obtain the compressed file includes: calling the first thread to sequentially read the storage address of the first-type file from the first queue; obtaining data of the first-type file according to the storage address of the first-type file; and compressing the data of the first-type file to obtain the compressed file.

When the first electronic device calls two threads to process the to-be-classified files, to better distinguish different types of files, the storage address of the first-type file may be stored in the first queue (namely, a preprocessing-type file queue), and a storage address of the second-type file may be stored in a second queue (namely, a direct-sending-type file queue). When the first thread is called to compress the first-type file, the first thread may read the storage address of the first-type file from the first queue to obtain and compress the first-type file, thereby improving file obtaining efficiency. Optionally, the first thread may sequentially read one first-type file from the first queue for compression, or may sequentially read multiple first-type files from the first queue for compression.

With reference to the first aspect, in some implementations of the first aspect, the calling the first thread to sequentially read the storage address of the first-type file from the first queue includes: calling the first thread to sequentially read storage addresses of a preset quantity of first-type files from the first queue; and correspondingly, the compressing the data of the first-type file to obtain the compressed file includes: sequentially compressing data of the preset quantity of first-type files to obtain the compressed file.

When reading the storage address of the first-type file from the first queue, the first thread may read the preset quantity (for example. 3 or another quantity) of storage addresses at a time, and compress the preset quantity of first-type files to obtain the compressed file. Therefore, multiple first-type files may be compressed into one compressed file, thereby further reducing a quantity of files to be sent and improving sending efficiency.

With reference to the first aspect, in some implementations of the first aspect, after the compressed file is obtained, the method further includes: calling the first thread to store the compressed file to obtain a storage address of the compressed file, and storing the storage address of the compressed file into a second queue, where the second queue stores a storage address of the second-type file.

After obtaining the compressed file through compression, the first thread may store the compressed file, and store the corresponding storage address into the second queue, so that the second thread reads the storage address from the second queue, and sends the compressed file to the second electronic device. Therefore, storing the storage address of the compressed file into the second queue by the first thread can provide data preparation for the second thread to send the file.

With reference to the first aspect, in some implementations of the first aspect, the calling the second thread to send the second-type file and the obtained compressed file to the second electronic device includes: calling the second thread to read the storage address of the second-type file and the storage address of the obtained compressed file from the second queue; obtaining data of the second-type file according to the storage address of the second-type file; obtaining data of the obtained compressed file according to the storage address of the obtained compressed file; and sending the data of the second-type file and the data of the obtained compressed file to the second electronic device.

The storage address of the second-type file and the storage address of the compressed file are stored in the second queue. When the second thread is called to send the second-type file and the compressed file, the second thread may read the storage addresses of the corresponding files from the second queue to obtain and send the corresponding files, thereby further improving the file obtaining efficiency.

With reference to the first aspect, in some implementations of the first aspect, during the concurrent execution by the first thread and the second thread, if a quantity of files corresponding to storage addresses in the second queue is less than a preset threshold, the method further includes: reading a first storage address in the first queue, storing the first storage address into the second queue, and deleting the first storage address from the first queue, where the first storage address is a storage address of a first-type file that has not been compressed in the first queue.

In this application, a priority of the second thread may be set to be higher than that of the first thread, in other words, it is preferentially ensured that there is a file to be sent by the second thread, to prevent the second thread from entering a waiting state. Therefore, when the quantity of files in the second queue is less than the preset threshold (for example, 3), it indicates that the sending thread is about to complete sending a file that needs to be sent, and the sending thread may be about to enter the waiting state and need to wait for the compression thread to perform a compression process. In this case, the first electronic device may move, from the first queue to the second queue, the storage address of the first-type file that has not been compressed in the first queue, that is, the file that originally needs to be compressed is not to be compressed, but is to be directly sent by the second thread. Therefore, the file sending efficiency can be further improved.

With reference to the first aspect, in some implementations of the first aspect, after the establishing a communication connection to the second electronic device, the method further includes: sending a first message to the second electronic device, where the first message notifies the second electronic device to receive the files, and receiving a message sent by the second electronic device according to the first message to confirm that the files are to be received.

Optionally, the first message carries at least one type of file types, file sizes, and file brief information of the multiple to-be-shared files.

After the communication connection is established between the first electronic device and the second electronic device, the first electronic device may further send basic information of the to-be-shared files to the second electronic device, such as at least one type of the file types, the file sizes, and the file brief information (such as thumbnails) of the to-be-shared files, before sending the files to the second electronic device, to inform the second electronic device to receive the files. In this case, the user may perform confirmation on the second electronic device. After the user confirms that the files are to be received, the second electronic device sends, to the first electronic device, the message confirming that the files are to be received. If the user finds that a wrong to-be-shared file is selected, the user may choose to refuse to receive the file on the second electronic device, and then re-select a to-be-shared file on the first electronic device. This can reduce a probability of sending a wrong file.

With reference to the first aspect, in some implementations of the first aspect, the classification policy is a policy for performing classification according to the file sizes and/or the file types of the to-be-shared files.

In this implementation, the first electronic device may classify the to-be-shared files according to the file sizes and/or the file types of the to-be-shared files. In an implementation, if a file size of a to-be-shared file is less than a first threshold (for example, 5 KB), the to-be-shared file is classified as a first-type file. If a file size of a to-be-shared file is greater than or equal to the first threshold, the to-be-shared file is classified as a second-type file. In another implementation, if a file type of a to-be-shared file is a first type (for example: txt, xls, xlsx, xlt, xlsm, docx, doc, bmp, and apk), the to-be-shared file is classified as a first-type file. If a file type of a to-be-shared file is not the first type, the to-be-shared file is classified as a second-type file. In still another implementation, a file whose file size is less than a first threshold is classified as a first-type file. A file whose file size is greater than a second threshold (for example, 60 MB) is classified as a second-type file. Files whose file sizes are between [the first threshold, the second threshold] are further classified according to file types: In these files, a file whose file type is a first type is classified as a first-type file. A file whose file type is a second type (for example: pptx, ppt, png, jpg, mp3, mp4, pdf, rar, zip, 7z, avi, rmbv, mky, rm, and exe) is classified as a second-type file. A file of another type is also temporarily classified as a second-type file. In still another implementation, a file whose file type is a first type is classified as a first-type file. A file whose file type is a second type is classified as a second-type file. Files of other types are further classified according to file sizes: In these files, a file whose file size is less than a first threshold is classified as a first-type file. A file whose file size is greater than a second threshold is classified as a second-type file. A file whose file size is between [the first threshold, the second threshold] is also temporarily classified as a second-type file.

With reference to the first aspect, in some implementations of the first aspect, the method further includes: displaying a second interface including identifiers of the multiple to-be-shared files; and displaying the first interface when receiving a second operation that is on the second interface and that is performed by the user on the identifiers of the multiple to-be-shared files.

The second interface is an interface displaying the identifiers of the multiple to-be-shared files. The user may select the multiple to-be-shared files on the interface, and then click a sharing option to jump to the first interface including the identifier of the second electronic device, so that the user selects the second electronic device and causes the establishment of the communication connection to the second electronic device. Therefore, the user can select, on the visual interfaces, the to-be-shared files and the target electronic device to which the files are to be sent, to improve interaction with the user.

According to a second aspect, this application provides a file sharing method, where the method is applied to a second electronic device, and includes: receiving and storing a second-type file and a compressed file that are sent by a first electronic device; storing a storage address of the compressed file into a third queue; creating a third thread; calling the third thread to read the storage address of the compressed file from the third queue; obtaining data of the compressed file according to the storage address of the compressed file; and decompressing the data of the compressed file to obtain and store a first-type file.

The second electronic device may receive the second-type file and the compressed file through a receiving thread, and store the received files into corresponding storage addresses. Then, the receiving thread determines whether there is the compressed file in the received files; and if yes, writes the storage address of the compressed file into the third queue (namely, a postprocessing queue). Next, the third thread (namely, the postprocessing thread) obtains the storage address of the compressed file from the third queue, obtains the corresponding compressed file according to the storage address, decompresses the compressed file, and finally stores the decompressed file into the storage address corresponding to the received file. This can reduce a data amount of the received files, to improve file sharing efficiency.

According to a third aspect, this application provides an apparatus. The apparatus is included in an electronic device, and has a function of implementing behavior of the electronic device in the first aspect and the possible implementations of the first aspect. The function may be implemented by hardware, or may be implemented by hardware executing corresponding software. The hardware or the software includes one or more modules or units corresponding to the foregoing function. For example, the hardware or the software includes a receiving module or unit and a processing module or unit.

According to a fourth aspect, this application provides an apparatus. The apparatus is included in an electronic device, and has a function of implementing behavior of the electronic device in the second aspect. The function may be implemented by hardware, or may be implemented by hardware executing corresponding software. The hardware or the software includes one or more modules or units corresponding to the foregoing function. For example, the hardware or the software includes a receiving module or unit and a processing module or unit.

According to a fifth aspect, this application provides an electronic device. The electronic device includes: a processor, a memory, and an interface, where the processor, the memory, and the interface cooperate with each other, to cause the electronic device to perform any method in the technical solution of the first aspect.

According to a sixth aspect, this application provides an electronic device. The electronic device includes: a processor, a memory, and an interface, where the processor, the memory, and the interface cooperate with each other, to cause the electronic device to perform any method in the technical solution of the second aspect.

According to a seventh aspect, this application provides a file sharing system, including a first electronic device and a second electronic device. The first electronic device performs any method in the technical solution of the first aspect, and the second electronic device performs any method in the technical solution of the second aspect.

According to an eighth aspect, this application provides a chip, including a processor. The processor is configured to read and execute a computer program stored in a memory, to perform the method in the first aspect and the possible implementations of the first aspect or the method in the implementation of the second aspect.

Optionally, the chip further includes the memory, where the memory is connected to the processor through a circuit or a wire.

Further, optionally, the chip further includes a communication interface.

According to a ninth aspect, this application provides a computer-readable storage medium. The computer-readable storage medium stores a computer program, and the computer program, when executed by a processor, causes the processor to perform any method in the technical solution of the first aspect or any method in the technical solution of the second aspect.

According to a tenth aspect, this application provides a computer program product. The computer program product includes: computer program code, and the computer program code, when executed on an electronic device, causes the electronic device to perform any method in the technical solution of the first aspect or any method in the technical solution of the second aspect.

Figure 15:
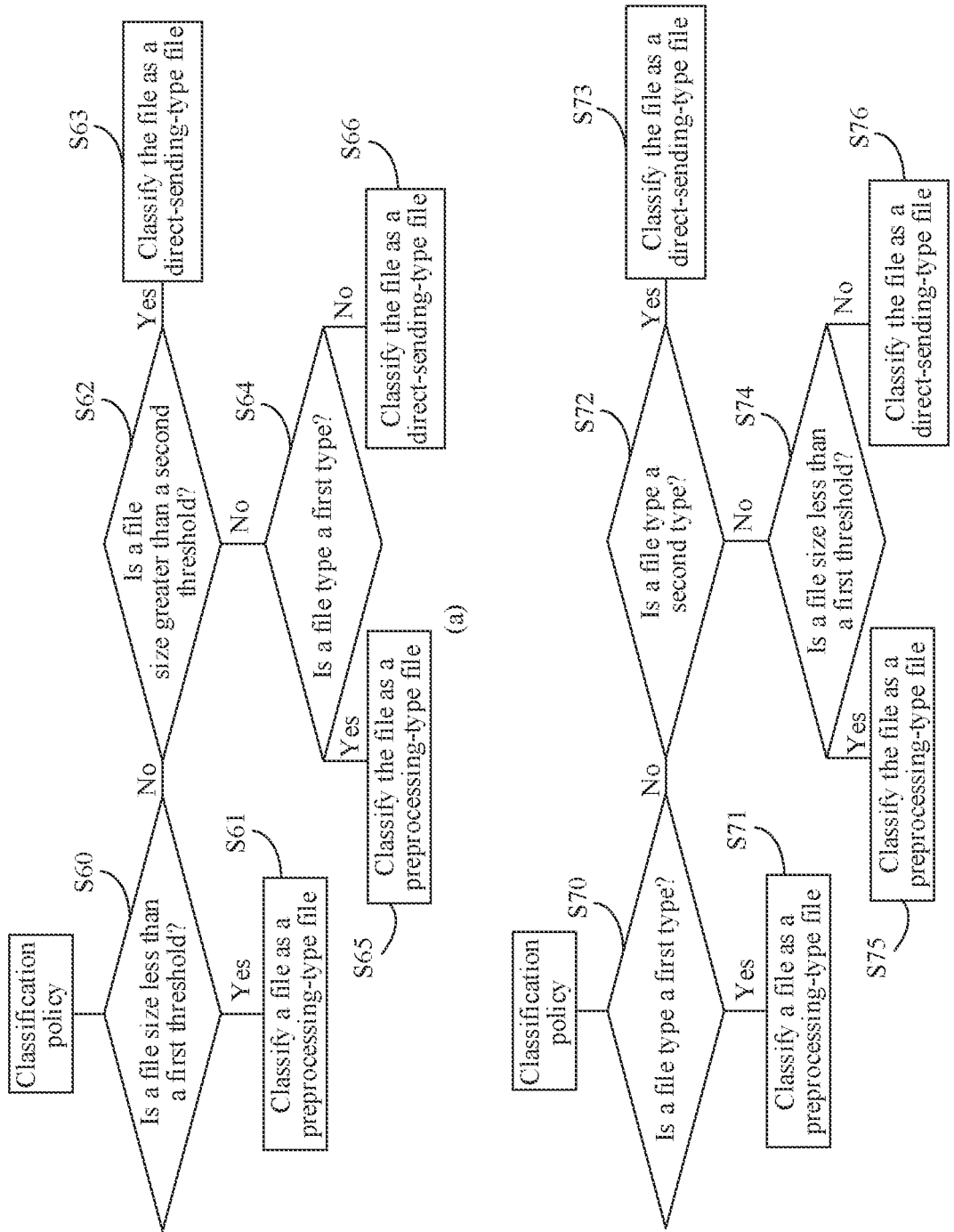
Figure 16:
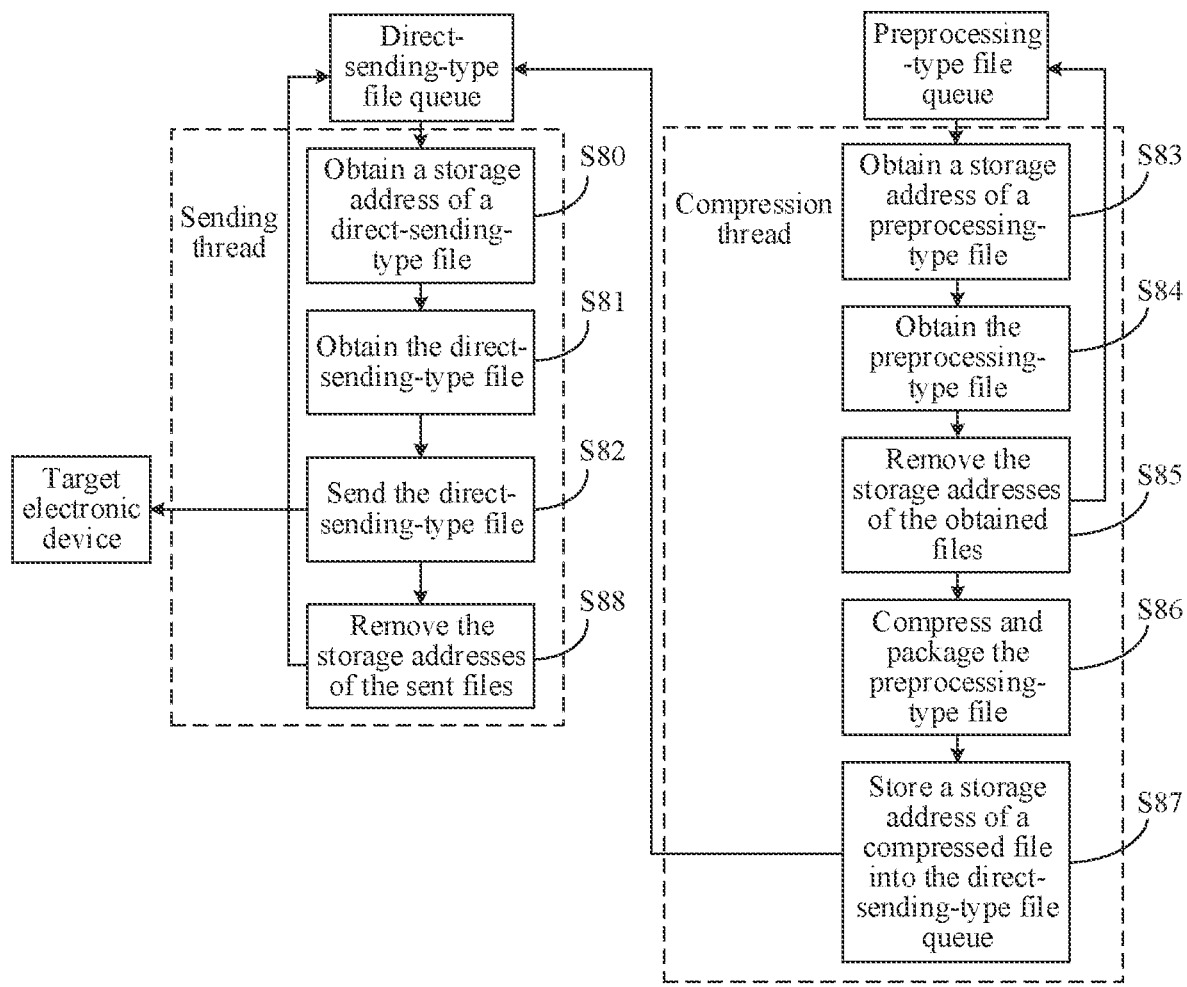
Figure 18:
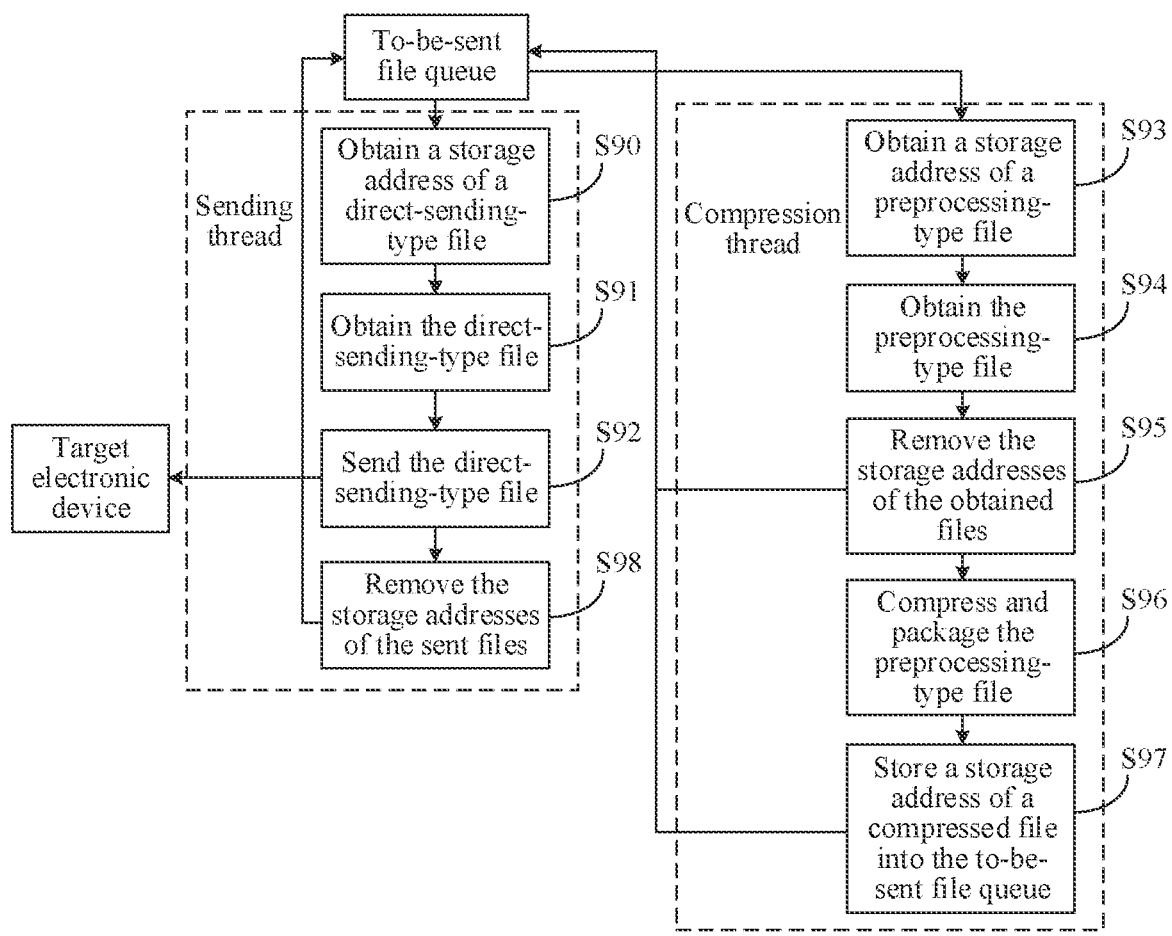
Figure 19:
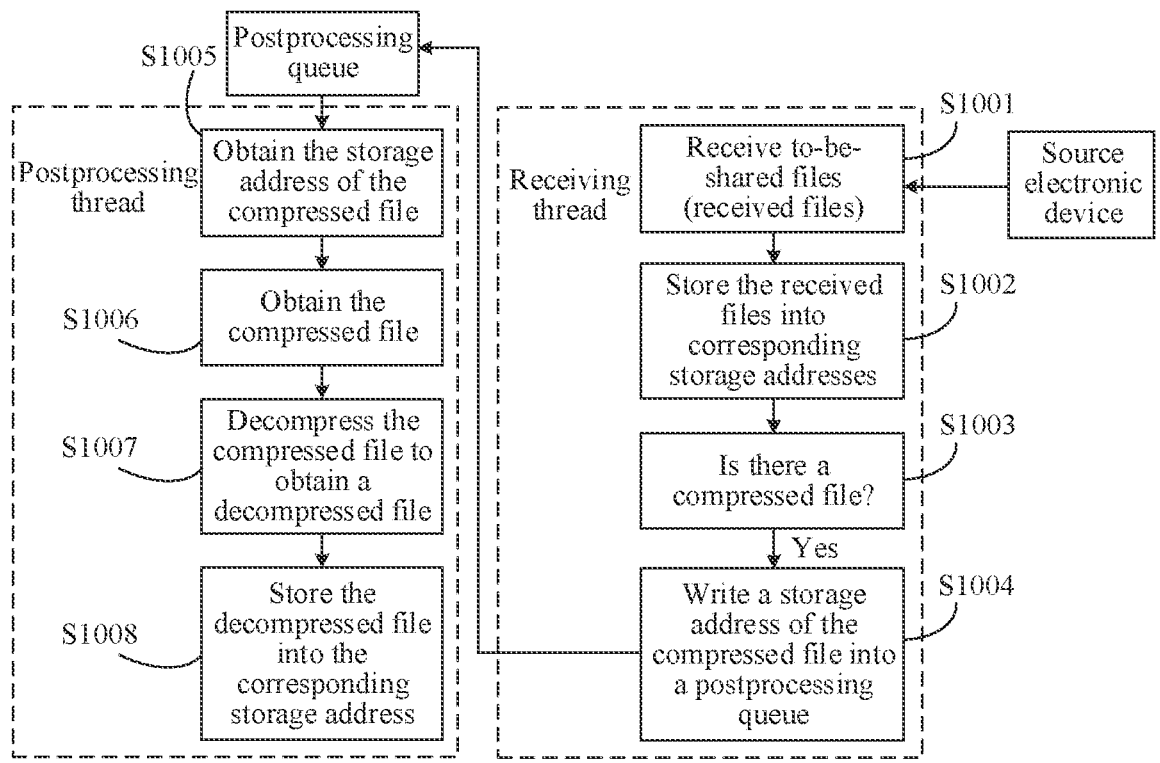
Figure 20:
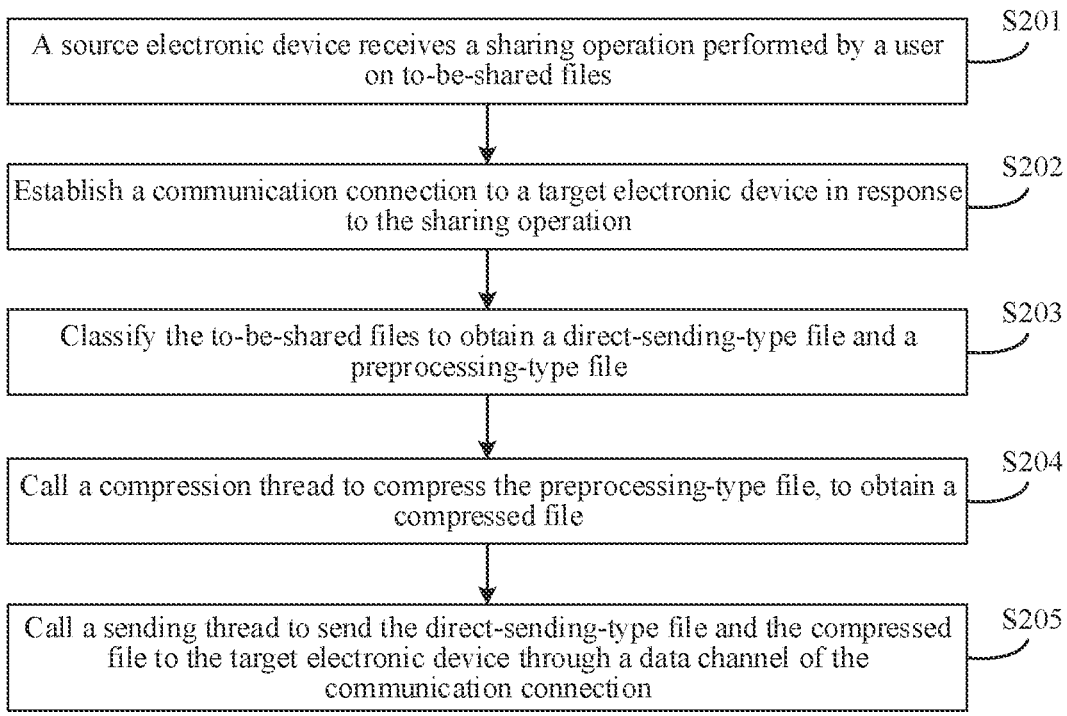

(a) in FIG. 15 is a flowchart of a classification policy according to an embodiment of this application;

(b) in FIG. 15 is another flowchart of a classification policy according to an embodiment of this application;

FIG. 16 is a flowchart of a first sending policy according to an embodiment of this application;

FIG. 17 is a schematic diagram of some data of an exhaustive experiment for classifying to-be-shared files according to an embodiment of this application:

FIG. 18 is a flowchart of a second sending policy according to an embodiment of this application;

FIG. 19 is a schematic diagram of a process in which a target electronic device receives a to-be-shared file according to an embodiment of this application; and FIG. 20 is another schematic flowchart of sharing a file by an electronic device according to an embodiment of this application.

DESCRIPTION OF EMBODIMENTS

Technical solutions in embodiments of this application are described below with reference to the accompanying drawings in the embodiments of this application. In the descriptions of the embodiments of this application, "/" means "or" unless otherwise specified. For example, A/B may represent A or B. In this specification, "and/or" describes only an association relationship between associated objects and indicates that three relationships may exist. For example, A and/or B may represent the following three cases: Only A exists, both A and B exist, and only B exists. In addition, in the descriptions of the embodiments of this application, "multiple" represents two or more.

The terms "first", "second", and "third" below are merely intended for an objective of description, and shall not be understood as an indication or implication of relative importance or implicit indication of a quantity of indicated technical features. Therefore, a feature limited by "first", "second", or "third" may explicitly or implicitly include one or more of the features.

Currently, there are increasing types of electronic devices. Using an example in which the electronic device is a PC 1, the PC 1 may have a file sharing function. Usually, after a user enables the file sharing function, and when the user wants to share multiple files (such as multiple pictures) in the PC 1 with another PC 2 or a mobile phone, the user may select the multiple to-be-shared pictures in a picture directory of the PC 1, select the PC 2 or the mobile phone through a "share" option, and then send the multiple pictures to the PC 2 or the mobile phone. When the user selects the PC 2 or the mobile phone on the PC 1, the PC 1 establishes, with the PC 2 or the mobile phone, a communication connection and a data channel for file transmission, and then sends the multiple files to the PC 2 or the mobile phone one by one through the data channel. However, a sharing process of sending the multiple files one by one is inefficient.

In view of this, the embodiments of this application provide a file sharing method. When an electronic device shares multiple files with another electronic device, the electronic device may start one sending thread according to factors such as types and sizes of the multiple files to directly send a part of the multiple files to the another electronic device, start one compression thread to compress and package a remaining part of the multiple files, and send a compressed file to the another electronic device through the sending thread. This can reduce a data amount of the shared files to improve sharing efficiency. In addition, concurrent execution by the two threads further improves the file sharing efficiency. It should be noted that the file sharing method provided in the embodiments of this application may be applied to an electronic device with a file sharing function, such as a mobile phone, a tablet computer, a PC, an ultra-mobile personal computer (ultra-mobile personal computer, UMPC), a netbook, and a personal digital assistant (personal digital assistant, PDA), to implement file transfer between devices of a same type or different types, for example, between mobile phones, between a mobile phone and a PC, between a mobile phone and a tablet computer, between a PC and a tablet computer, and between PCs. A specific type of the electronic device is not limited in the embodiments of this application.

Figure 1:
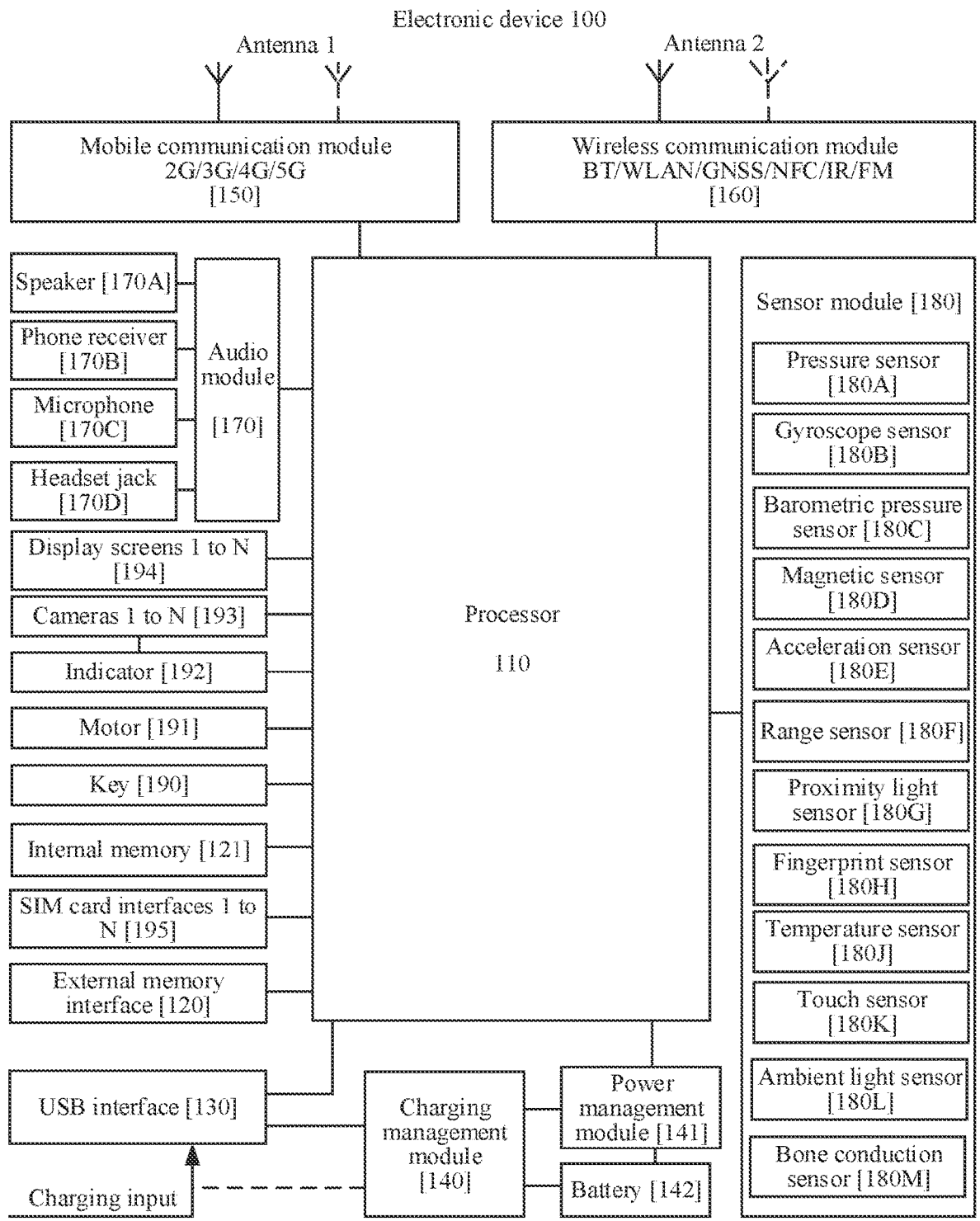
FIG. 1 is a schematic structural diagram of an electronic device according to an embodiment of this application.

For example, FIG. 1 is a schematic structural diagram of an electronic device 100 according to an embodiment of this application. Using an example in which the electronic device 100 is a mobile phone, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, a proximity light sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor. ISP), a controller, a memory, a video codec, a digital signal processor (digital signal processor, DSP), a baseband processor, and/or a neural-network processing unit (neural-network processing unit, NPU). Different processing units may be separate components, or may be integrated into one or more processors.

The controller may be a nerve center and a command center of the electronic device 100. The controller may generate an operation control signal according to instruction operation code and a time-sequence signal, and control obtaining and execution of instructions.

The wireless communication module 160 may provide a solution to wireless communication applied to the electronic device 100, for example, wireless local area networks (wireless local area networks, WLANs) (for example, a wireless fidelity (wireless fidelity, Wi-Fi) network), Bluetooth (bluetooth, BT), a global navigation satellite system (global navigation satellite system. GNSS), frequency modulation (frequency modulation, FM), near field communication (near field communication, NFC), and an infrared (infrared, IR) technology. The wireless communication module 160 may be one or more components into which at least one communication processing module is integrated. The wireless communication module 160 receives an electromagnetic wave through the antenna 2, performs frequency modulation on and filters the electromagnetic wave signal, and sends a processed signal to the processor 110. The wireless communication module 160 may further receive a to-be-sent signal from the processor 110, perform frequency modulation on and amplify the to-be-sent signal, and convert the to-be-sent signal into an electromagnetic wave through the antenna 2 for radiation.

The electronic device 100 implements a display function through the GPU, the display screen 194, the application processor, and the like. The GPU is a microprocessor for image processing and is connected to the display screen 194 and the application processor. The GPU is configured to perform mathematical and geometric calculations, and is configured to render graphics. The processor 110 may include one or more GPUs that execute a program instruction to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode. OLED), an active-matrix organic light emitting diode (active-matrix organic light emitting diode, AMOLED), a flex light-emitting diode (flex light-emitting diode, FLED), a mini LED, a micro LED, a micro-OLED, a quantum dot light emitting diode (quantum dot light emitting diode, QLED), or the like. In some embodiments, the electronic device 100 may include one or N display screens 194, where N is a positive integer greater than 1.

The touch sensor 180K is also referred to as a "touch panel". The touch sensor 180K may be arranged on the display screen 194. The touch sensor 180K and the display screen 194 form a touchscreen. The touch sensor 180K is configured to detect a touch operation on or near the touch sensor 180K. The touch sensor may transfer the detected touch operation to the application processor to determine a type of a touch event. The touch sensor 180K may provide a visual output related to the touch operation through the display screen 194. In some other embodiments, the touch sensor 180K may alternatively be arranged on a surface of the electronic device 100 at a position different from that of the display screen 194.

Figure 2:
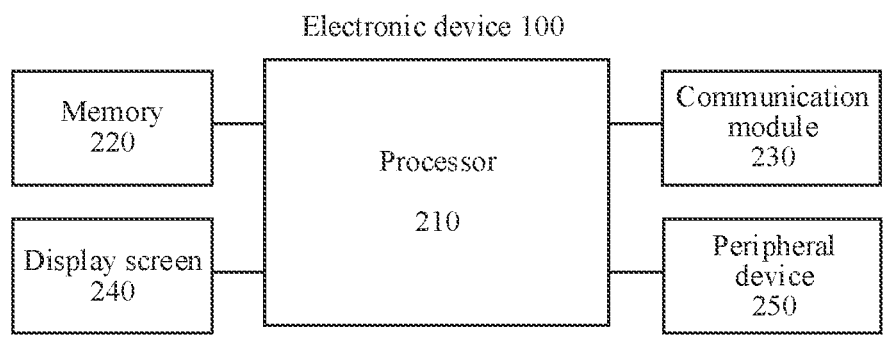
FIG. 2 is another schematic structural diagram of an electronic device according to an embodiment of this application.

For example, FIG. 2 is another schematic structural diagram of an electronic device 100 according to an embodiment of this application. Using an example in which the electronic device 100 is a PC, the electronic device 100 may include a processor 210, a memory 220, a communication module 230, and the like.

The processor 210 may include one or more processing units, and the memory 220 is configured to store program code and data. In this embodiment of this application, the processor 210 may execute computer-executable instructions stored in the memory 220, to control and manage behavior of the electronic device 100.

The communication module 230 may be used for communication between internal modules of the electronic device 100, communication between the electronic device 100 and another external electronic device, and the like. For example, if the electronic device 100 communicates with another electronic device through a wired connection, the communication module 230 may include an interface and the like, for example, a USB interface. The USB interface may be an interface conforming to the USB standard specification, and may be specifically a mini USB interface, a micro USB interface, a USB Type-C interface, or the like. The USB interface may be configured to be connected to a charger to charge the electronic device 100, may be used for data transmission between the electronic device 100 and a peripheral device, and may be configured to be connected to a headset to play audio through the headset. The interface may be further configured to be connected to another electronic device such as an augmented reality (augmented reality, AR) device.

Alternatively, the communication module 230 may include an audio component, a radio frequency circuit, a Bluetooth chip, a Wi-Fi chip, an NFC module, and the like, and may implement interaction between the electronic device 100 and another electronic device in many different manners.

Optionally, the electronic device 100 may further include a display screen 240, and the display screen 240 may display an image, a video, and the like on a human-device interaction interface.

Optionally, the electronic device 100 may further include a peripheral device 250, for example, a mouse, a keyboard, a speaker, and a microphone.

It should be understood that the structure of the electronic device 100 is not specifically limited in this embodiment of this application except for various components or modules enumerated in FIG. 1 or FIG. 2. In some other embodiments of this application, the electronic device 10 may further include more or fewer components than those shown in the figure, some components may be combined, some components may be split, or there may be a different component layout. The components shown in the figure may be implemented by hardware, software, or a combination of software and hardware.

Figure 3:
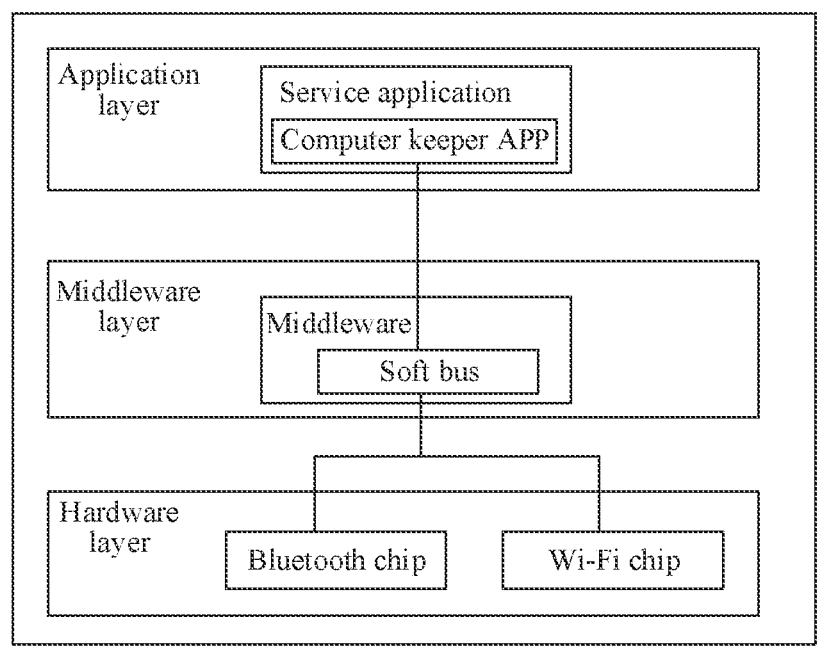
FIG. 3 is a block diagram of a software structure of an electronic device according to an embodiment of this application.

FIG. 3 is a block diagram of a software structure of the electronic device 100 according to this embodiment of this application. In a hierarchical architecture, software is divided into several layers, and each layer has a clear role and task. The layers communicate with each other through a software interface. In some embodiments, a software system may be divided into an application layer, a middleware layer, and a hardware layer from top to bottom.

As shown in FIG. 3, the application layer may include various installed applications (applications, APPs), for example, a computer keeper APP and another service application in a PC, and the service application can provide capabilities such as device management, event processing, message processing, task management, progress management, and anomaly determining. The hardware layer includes hardware modules such as a Bluetooth chip and a Wi-Fi chip.

Middleware such as a soft bus is distributed at the middleware layer. The middleware is a type of software between an application system and system software, and uses a basic service (function) provided by the system software to connect parts or different applications of the application system on a network, to achieve resource sharing and function sharing. In the PC, the soft bus can communicate with the computer keeper APP, and perform a corresponding response action according to a requirement of the computer keeper APP, for example, performing device discovery and connection operations and a data transmission operation. In addition, during data transmission, the soft bus can also call corresponding hardware according to a hardware capability of the lower hardware layer for the data transmission, for example, calling the Bluetooth chip for data transmission on a Bluetooth data channel.

For ease of understanding, in the following embodiments of this application, the file sharing method provided in the embodiments of this application is specifically described with reference to the accompanying drawings and application scenarios by using an electronic device with the structures shown in FIG. 1 to FIG. 3 as an example.

Figure 4:
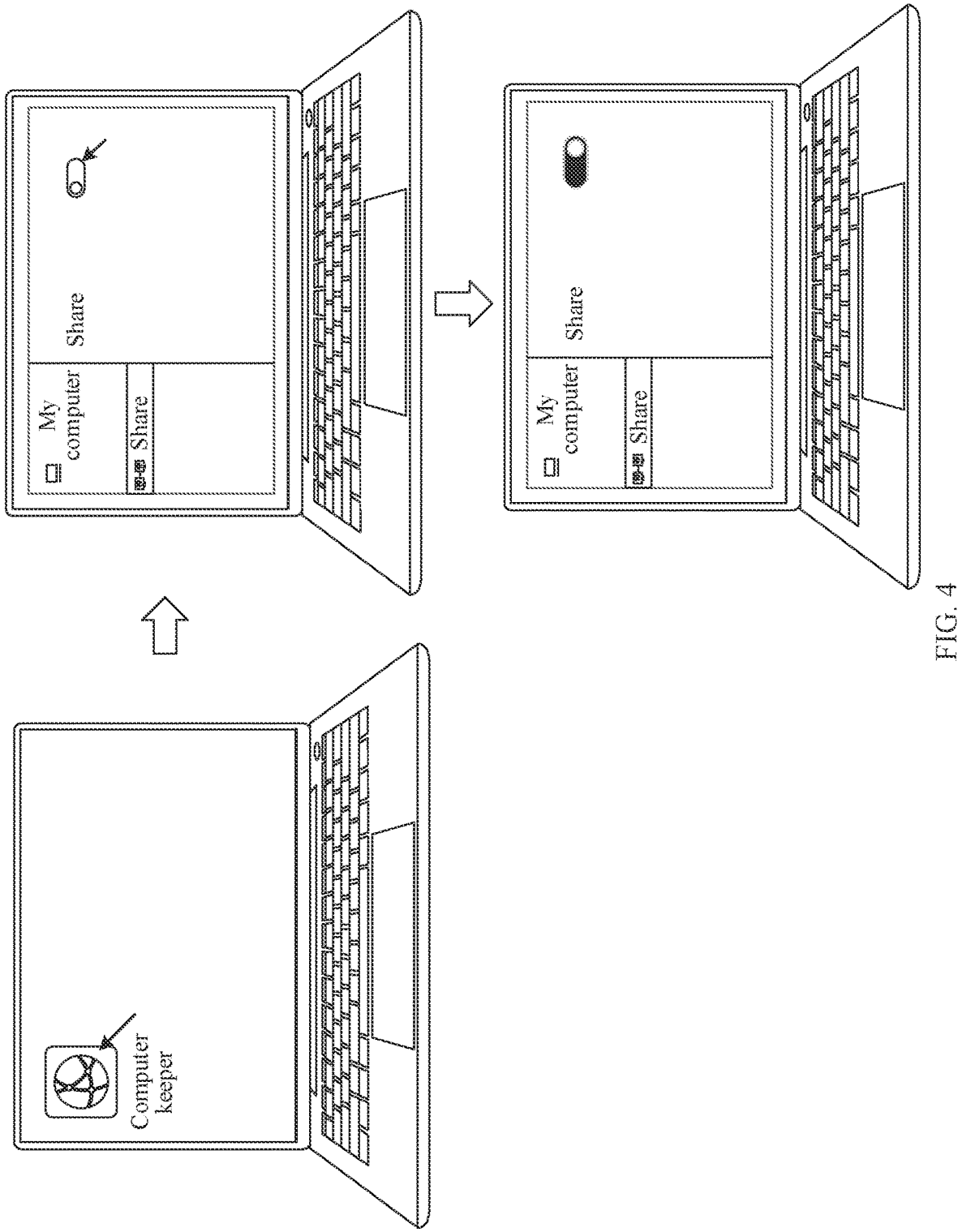
FIG. 4 is a schematic diagram of a process in which a PC enables a sharing function according to an embodiment of this application.
Figure 5A:
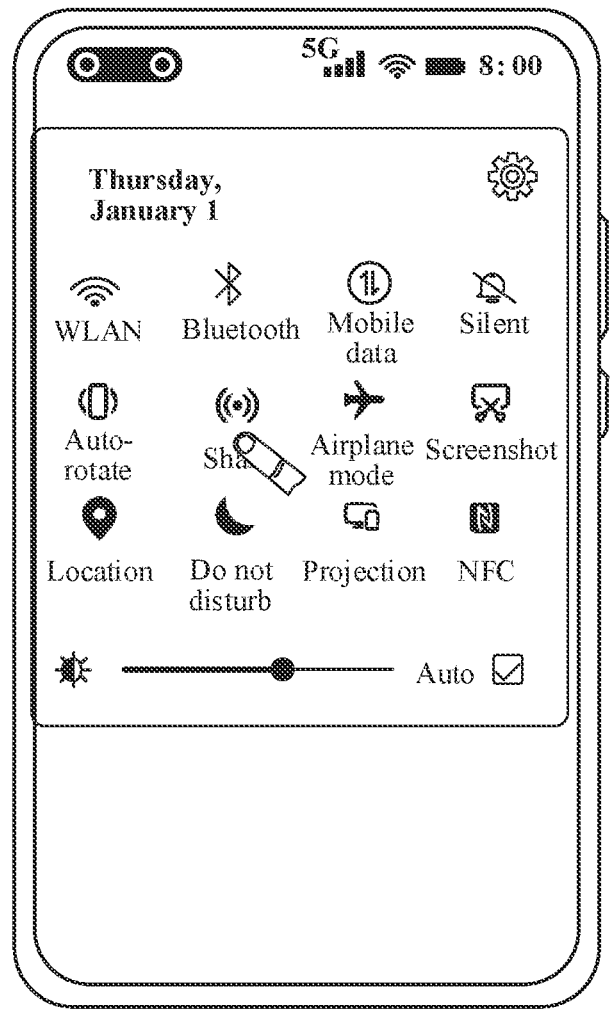
FIG. 5A is a schematic diagram of a process in which a mobile phone enables a sharing function according to an embodiment of this application.
Figure 5B:
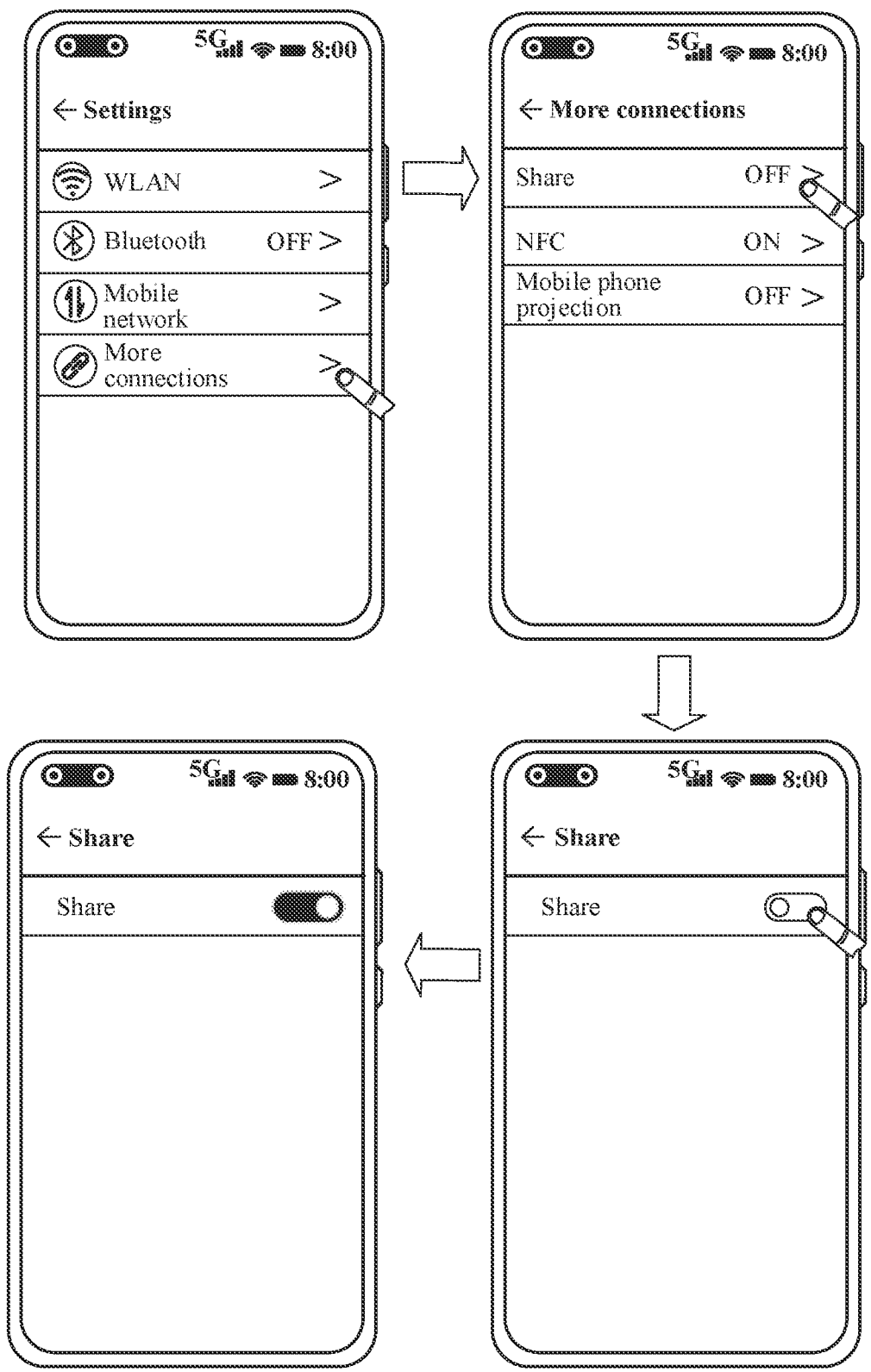
FIG. 5B is another schematic diagram of a process in which a mobile phone enables a sharing function according to an embodiment of this application.

For example, a PC and a mobile phone perform file transfer, in other words, the PC may send a file to the mobile phone, and the mobile phone may also send a file to the PC. In a first scenario, a user needs to enable sharing functions of the PC and the mobile phone first, w % here a process of enabling the sharing function at a PC end may be as follows: As shown in FIG. 4, a computer keeper APP icon on a desktop may be clicked by a mouse to open a computer keeper APP. There is a function sharing switch on an opening page of the computer keeper APP, so that the user can click the switch to enable the sharing function. Alternatively, there is a shortcut entry of the computer keeper APP in a taskbar of the PC, and the sharing function is enabled through the shortcut entry. A process of enabling the sharing function at a mobile phone end may be as follows: As shown in FIG. 5A, the file sharing function may be enabled by pulling down a system menu and tapping a "share" switch in the system menu. Alternatively, as shown in FIG. 5B, a "share" option is found on a setting page through a setting path on the mobile phone, and the user taps the option to jump to a switch page of the sharing function. On the page, the user may enable the sharing function by tapping a switch control.

Figure 6:
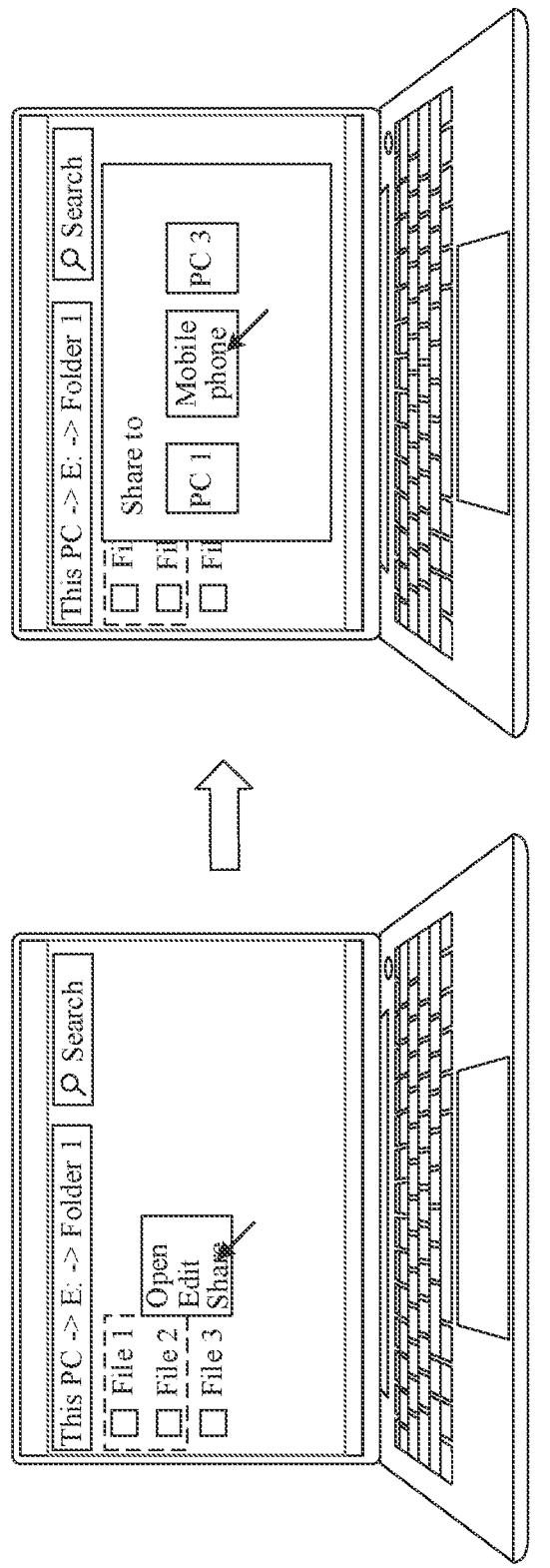
FIG. 6 is a schematic diagram of a process in which a PC sends a file to a mobile phone according to an embodiment of this application.

After the user enables the file sharing function, on one hand, if the user wants to use the PC to send files to the mobile phone, as shown in FIG. 6, the user may open a folder to which the to-be-shared files belong, select the multiple to-be-shared files, click a right mouse button, and select a "share" option in a pop-up operation option list. In this case, a display page of the PC may display a list of devices (including the foregoing mobile phone) whose sharing functions have also been enabled and that are near the PC, so that the user can select the mobile phone as a target device and cause the PC to establish a communication connection to the mobile phone, to send the to-be-shared files to the mobile phone.

Figure 7:
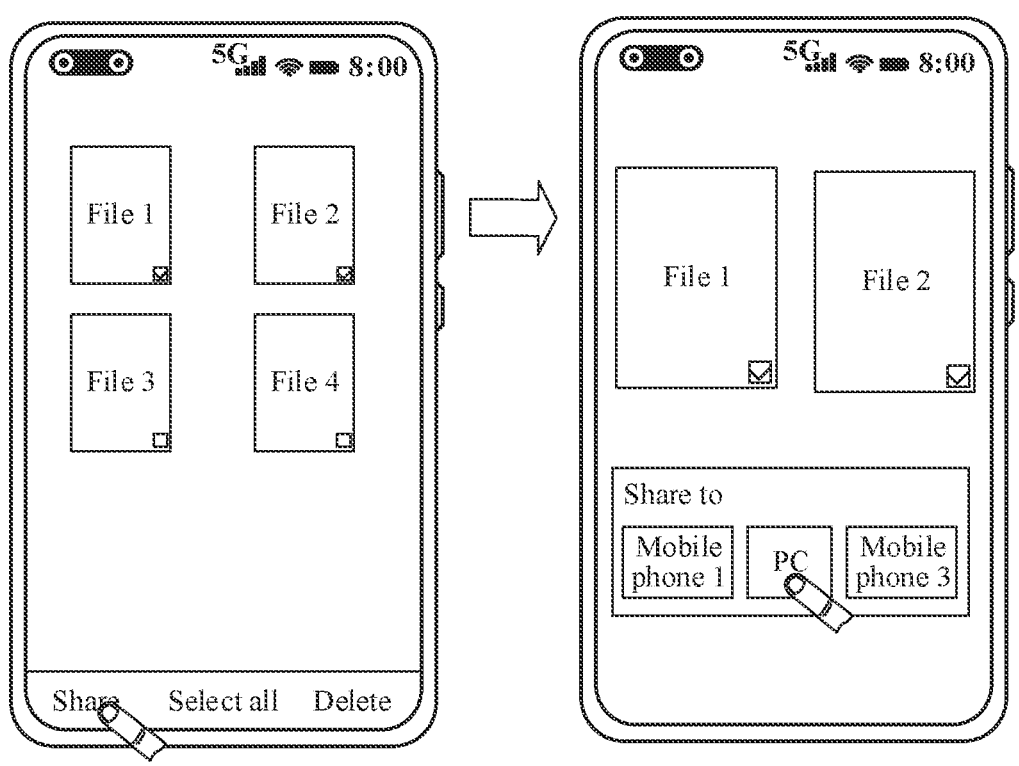
FIG. 7 is a schematic diagram of a process in which a mobile phone sends a file to a PC according to an embodiment of this application.

On the other hand, if the user wants to use the mobile phone to send files to the PC, as shown in FIG. 7, the user may open a directory to which the to-be-shared files belong, select the multiple to-be-shared files, and tap a "share" option. In this case, a display page of the mobile phone may display a list of devices (including the foregoing PC) whose sharing functions have also been enabled and that are near the mobile phone, so that the user can select the PC as a target device and cause the mobile phone to establish a communication connection to the PC, to send the to-be-shared files to the PC.

Figure 8:
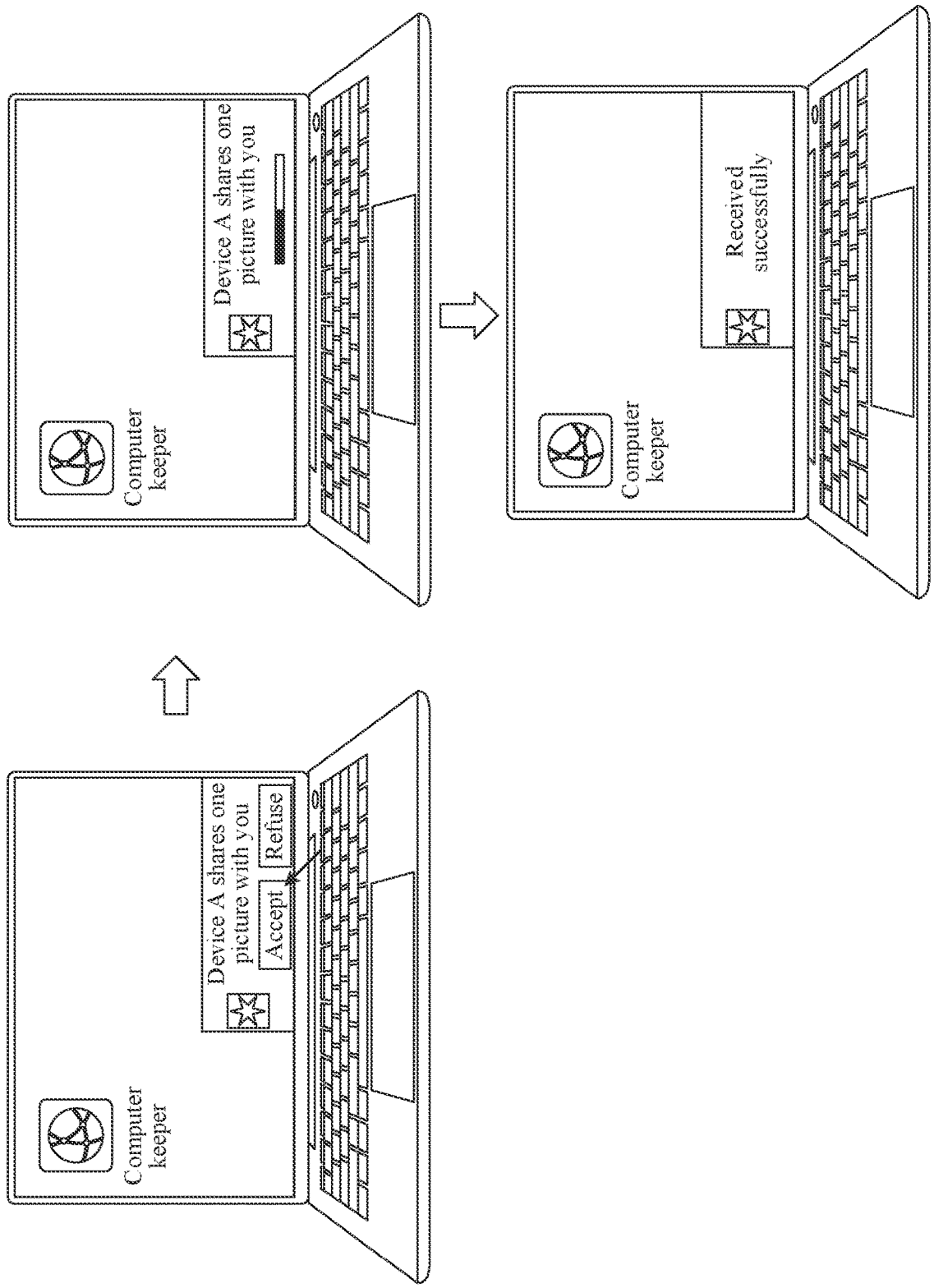
FIG. 8 is a schematic diagram of a display interface when a PC receives a file according to an embodiment of this application.

In this scenario, the communication connection established between the PC and the mobile phone may be a Bluetooth connection, a Wi-Fi P2P (peer to peer) connection, or the like. For a specific connection process, refer to descriptions in the following embodiments. In addition, as shown in FIG. 8, when the mobile phone sends a file (such as a picture) to the PC, a prompt message like "Device A shares one picture with you" may be displayed on an interface of the PC. After the user clicks a "receive" button, a progress message "Device A shares one picture with you" may be displayed on the interface of the PC, and a prompt message "Received successfully" is displayed after the file is received. Similarly, when the PC sends a file to the mobile phone, a similar prompt message may also be displayed on an interface of the mobile phone.

In a second scenario, a user may turn on a WLAN switch and a Bluetooth switch in the mobile phone and the PC, and then a communication connection is established between the PC and the mobile phone through a connection interface of a computer keeper APP in the PC. In this case, as shown in FIG. 9, when the user clicks a shortcut entry of the computer keeper APP in a taskbar of the PC, a "multi-screen collaboration" page may be displayed, where the page may display a currently connected device, namely, the foregoing mobile phone.

Figure 9:
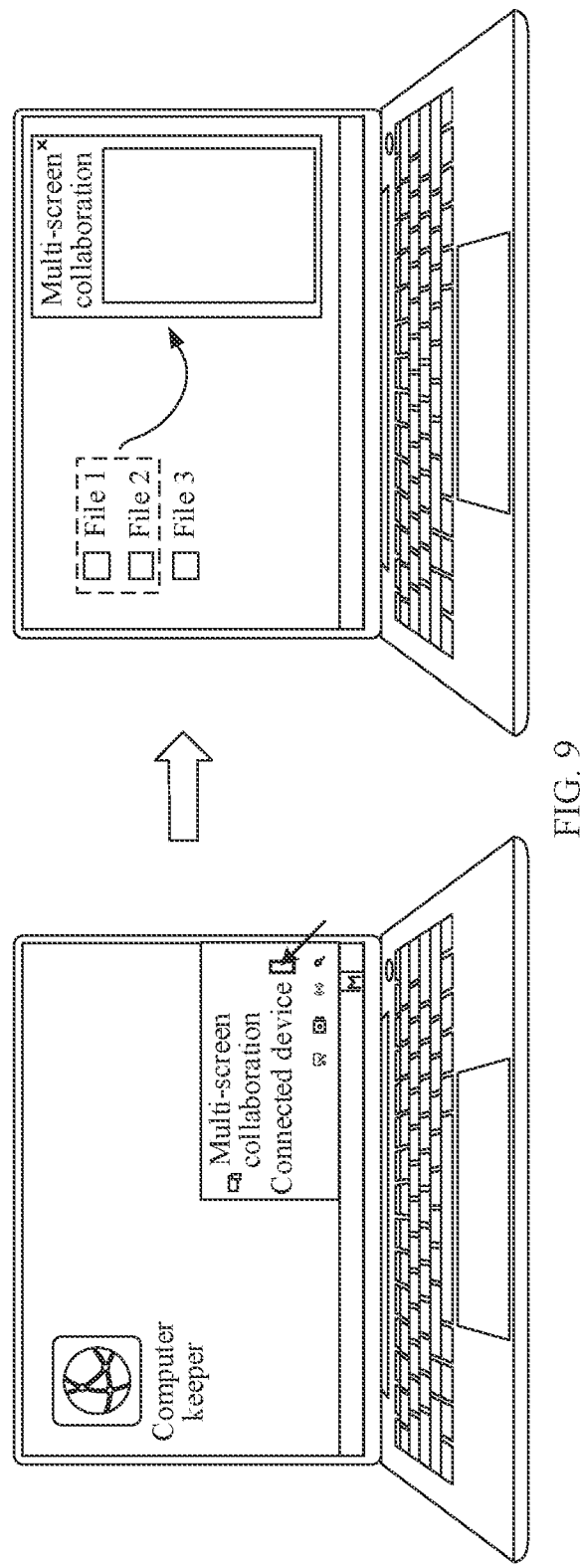
FIG. 9 is another schematic diagram of a process in which a PC sends a file to a mobile phone according to an embodiment of this application.

In this scenario, when the user clicks an icon of the connected device (the mobile phone) in FIG. 9, a mobile phone screen may be displayed on a desktop of the PC. In this case, if the user wants to send a file in the PC to the mobile phone, the user may select the file on the PC and drag the file to a mobile phone window, to implement a process of sending the file from the PC to the mobile phone. If the user wants to send a file in the mobile phone to the PC, the user may press and hold, until a "+" icon appears, the file in the mobile phone on a mobile phone window displayed on the PC, and then drag the file to a folder corresponding to the PC, to implement a process of sending the file from the mobile phone to the PC (where this process is not shown in the figure).

Figure 10:
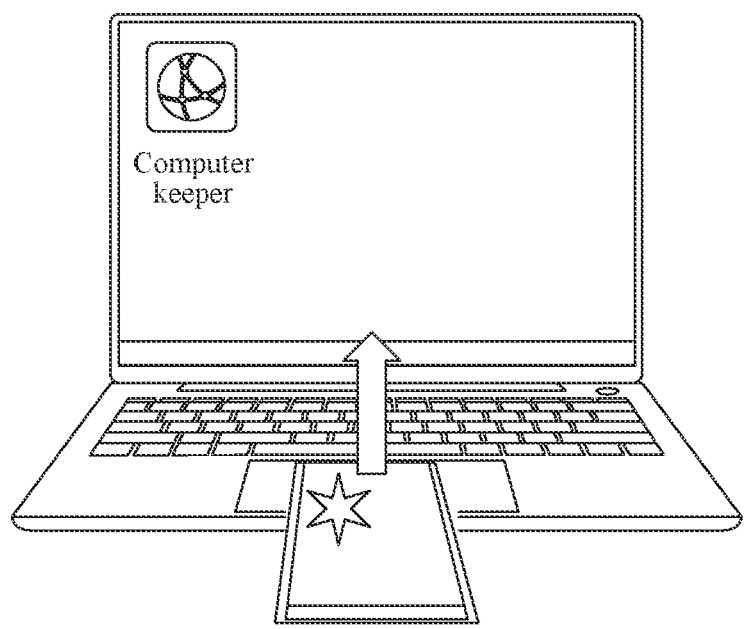
FIG. 10 is another schematic diagram of a process in which a mobile phone sends a file to a PC according to an embodiment of this application.

In a third scenario, if a user wants to send a file in the mobile phone to the PC, as shown in FIG. 10, the user may turn on an NFC switch of the mobile phone, open, by using a corresponding application, the file that needs to be sent, and then make an NFC area of the mobile phone in light contact with a sharing sensing area or a label on the PC. In this case, the mobile phone may establish an NFC connection to the PC, and negotiate on a channel of the NFC connection for establishing a data transmission channel, to complete a file transmission process.

For the foregoing three scenarios, file transfer between the PC and the mobile phone can be implemented, but it should be noted that, a scenario of the file transfer between the PC and the mobile phone in the embodiments of this application is not limited to the foregoing three scenarios.

In the foregoing scenarios, in a process of file transmission between the PC and the mobile phone, to improve file sharing efficiency, in the embodiments of this application, a file sending device starts one sending thread according to factors such as types and sizes of multiple files to directly send a part of the multiple files to a receiving device, start one compression thread to compress and package a remaining part of the multiple files, and send a compressed file to the receiving device through the sending thread. This can reduce a data amount of the shared files, to improve the sharing efficiency. In addition, concurrent execution by the two threads also improves the file sharing efficiency. For a specific implementation process of the file transmission, refer to descriptions of the following embodiments in detail.

For convenience of understanding, in the following embodiments, an electronic device that stores a to-be-shared file is referred to as a source electronic device, and an electronic device that receives the to-be-shared file is referred to as a target electronic device. It can be learned from the foregoing descriptions that the source electronic device does not perform a file sharing process until the source electronic device receives a sharing operation performed by a user. In this case, a processing procedure in which the source electronic device sends a file to the target electronic device is described in detail in the following embodiments by using the foregoing first scenario.

According to the structure and the software architecture of the foregoing electronic device, the electronic device may have a foreground UI interface, a Services background service, and a Nearby module during normal operation. The UI interface may present screen content of the electronic device to the user and enable the user to perform an interactive operation on the UI interface. Services may serve the UI interface, and is responsible for scheduling of a data flow and a service. Nearby may search for and discover a nearby device according to an instruction of Services and connect to the device.

Figure 11:
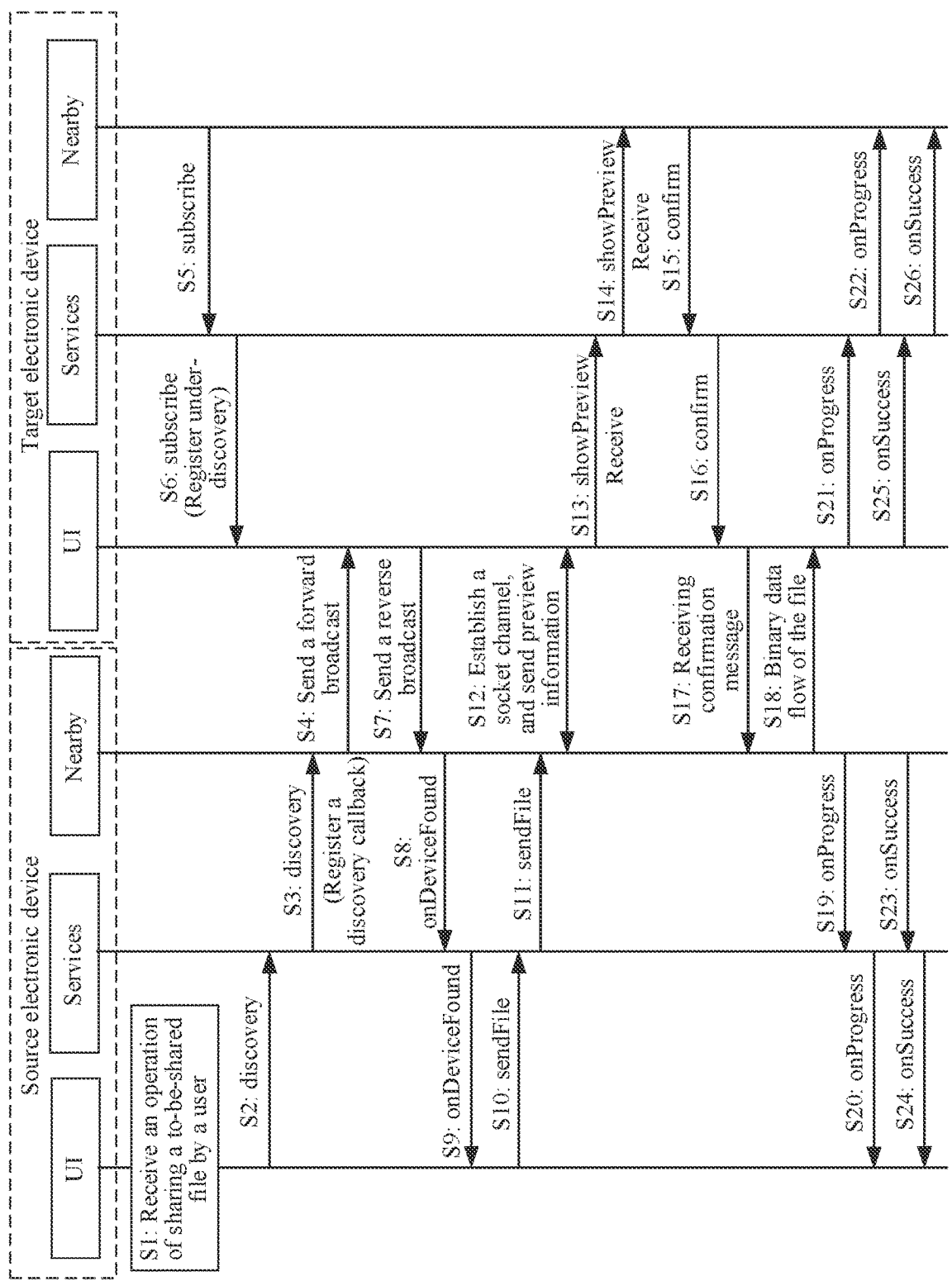
FIG. 11 is a schematic flowchart of sharing a file by an electronic device according to an embodiment of this application.

In this architecture, as shown in FIG. 11, a process in which the source electronic device sends a file to the target electronic device may include:

S1: The UI of the source electronic device receives an operation of sharing a to-be-shared file by the user.

S2: The UI of the source electronic device sends a discovery instruction to Services.

The discovery instruction may be sent by calling a discovery interface.

S3: Services of the source electronic device sends the discovery instruction to Nearby.

A discovery callback needs to be registered when Services calls the discovery interface to send the discovery instruction to Nearby, in other words. Nearby needs to send device information back to Services after discovering the device.

S4: Nearby of the source electronic device sends a forward broadcast.

It should be noted herein that, if the target electronic device expects to be discovered by the source electronic device, an under-discovery function of the target electronic device needs to first enabled, to be specific, steps S5 and S6 need to be performed:

S5: The UI of the target electronic device sends an under-discovery instruction to Services.

The under-discovery instruction may be sent by calling a subscribe interface.

S6: Services of the target electronic device sends the under-discovery instruction to Nearby.

Device under-discovery needs to be registered when Services calls the subscribe interface to send the under-discovery instruction to Nearby.

Then, after receiving the forward broadcast from the source electronic device, Nearby of the target electronic device may perform the following step:

S7: Nearby of the target electronic device sends a reverse broadcast.

S8: Nearby of the source electronic device sends a message for the discovered device to Services.

Nearby may call an onDeviceFound interface to send the message to Services.

S9: Services of the source electronic device sends the message for the discovered device to the UI for the user to view the device information.

S10: The UI of the source electronic device sends the to-be-shared file to Services.

S11: Services of the source electronic device sends the to-be-shared file to Nearby.

The to-be-shared file may be sent by calling a sendfile interface.

S12: Nearby of the source electronic device establishes a socket channel with Nearby of the target electronic device, and sends preview information of the to-be-shared file.

The preview information of the to-be-shared file may be generated by Nearby of the source electronic device. For example, a preview picture is generated.

S13: Nearby of the target electronic device sends the preview information to Services.

S14: Services of the target electronic device sends the preview information to the UI for the user to check and confirm.

The preview information may be sent by calling a showPreviewReceive interface.

After the user performs a click operation on the target electronic device to confirm that the file is to be received, the target electronic device may perform steps S15 to S17:

S15: The UI of the target electronic device sends confirmation information to Services.

S16: Services of the target electronic device sends the confirmation information to Nearby.

The confirmation information may be sent by calling a confirm interface.

S17: Nearby of the target electronic device sends a receiving confirmation message to Nearby of the source electronic device.

S18: Nearby of the source electronic device sends the to-be-shared file as a binary data flow to Nearby of the target electronic device.

In a process of receiving the to-be-shared file by the target electronic device, display screens of the source electronic device and the target electronic device may simultaneously display a sending progress. For example, the progress increases from 1% to 100%. The source electronic device may perform steps S19 and S20 and steps S23 and S24, and the target electronic device may perform steps S21 and S22 and steps S25 and S26:

S19: Nearby of the source electronic device sends progress information to Services.

S20: Services of the source electronic device sends the progress information to the UI for the user to check the sending progress.

The progress information may be sent by calling an onProgress interface.

S21: Nearby of the target electronic device sends the progress information to Services.

S22: Services of the target electronic device sends the progress information to the UI for the user to check the sending progress.

The progress information may be sent by calling an onProgress interface.

S23: Nearby of the source electronic device sends success information to Services.

S24: Services of the source electronic device sends the success information to the UI for the user to check a sending result.

The success information may be sent by calling an onSuccess interface.

S25: Nearby of the target electronic device sends the success information to Services.

S26: Services of the target electronic device sends the success information to the UI for the user to check the sending result.

The success information may be sent by calling an onSuccess interface.

The process in which the source electronic device sends the to-be-shared file to the target electronic device is completed through the foregoing process.

Figure 12A:
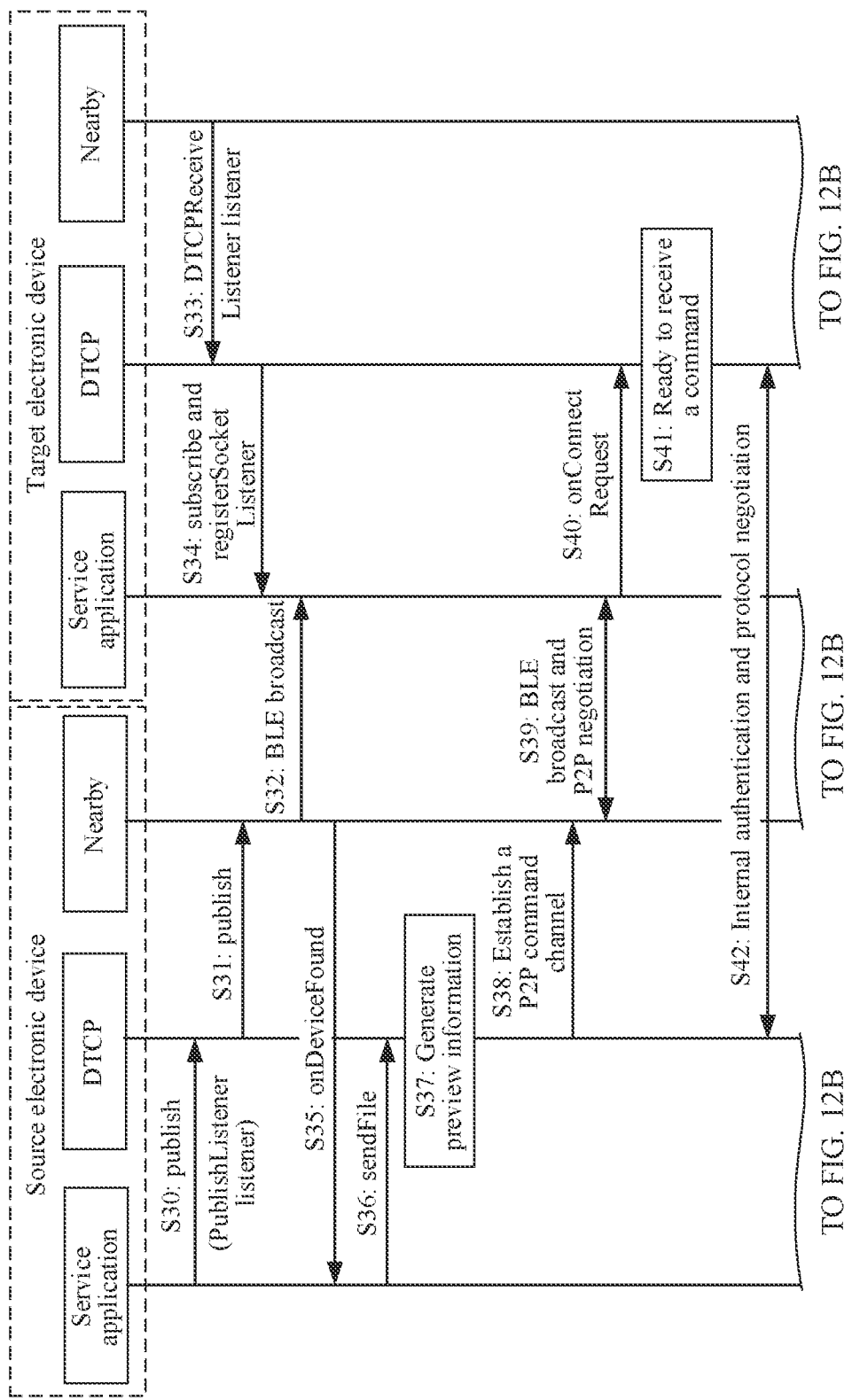
FIG. 12A and FIG. 12B are another schematic flowchart of sharing a file by an electronic device according to an embodiment of this application.
Figure 12B:
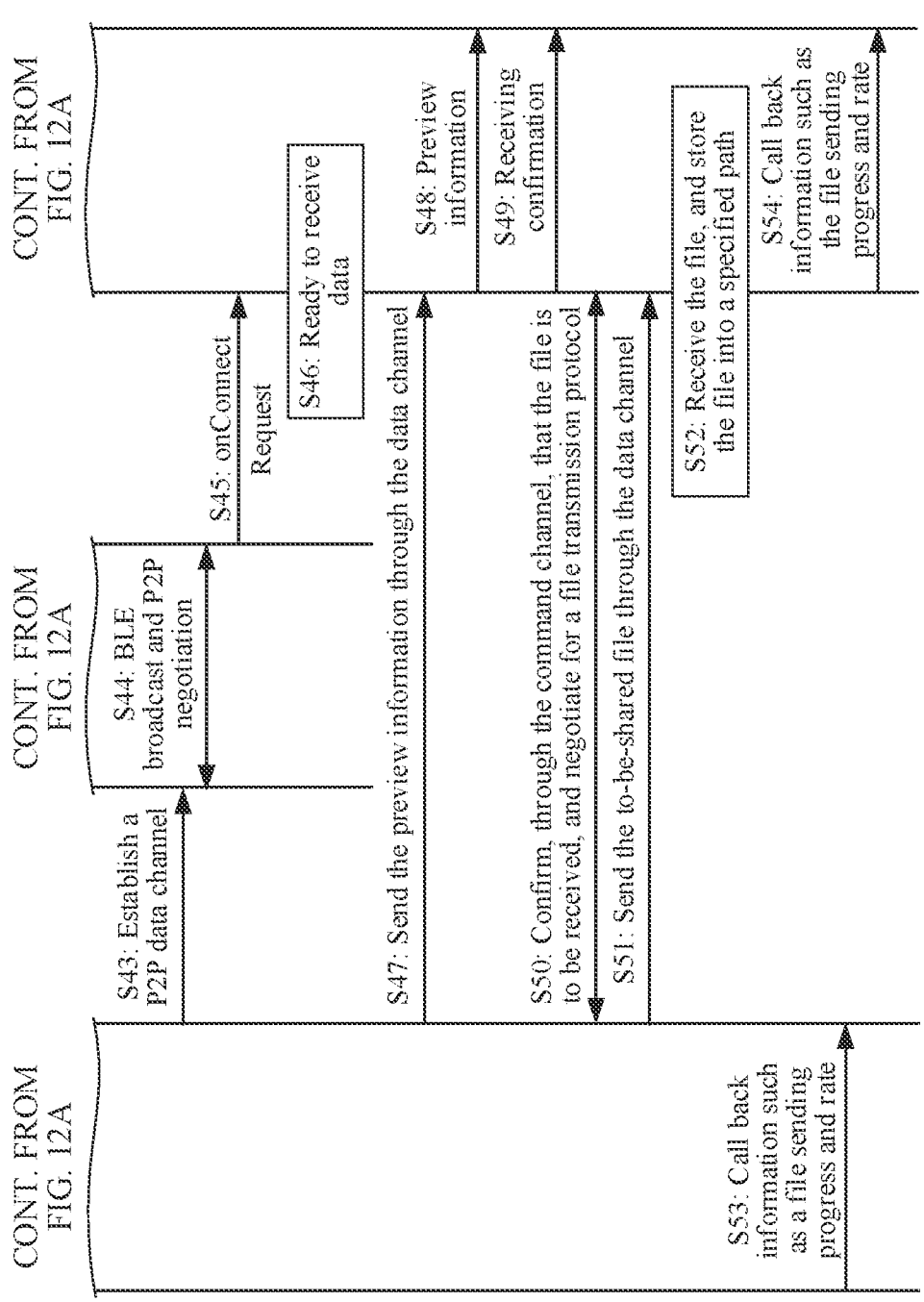

In an embodiment, Nearby of the electronic device may further include digital transmission content protection (digital transmission content protection, DTCP), and the function of Services may alternatively be completed by a service application. In this case, as shown in FIG. 12A and FIG. 12B, the process of sending the to-be-shared file may alternatively be implemented through the following steps:

S30: The service application of the source electronic device sends a discovery instruction to the DTCP.

The service application may call a publish interface, for example, a PublishListener listener interface, to send the discovery instruction to the DTCP.

S31: The DTCP of the source electronic device sends the discovery instruction to Nearby.

S32: Nearby of the source electronic device performs a Bluetooth low energy (bluetooth low energy, BLE) broadcast.

It should be noted herein that, if the target electronic device expects to be discovered by the source electronic device, an under-discovery function of the target electronic device needs to first enabled, to be specific, steps S33 and S34 need to be performed:

S33: The service application of the target electronic device sends an under-discovery instruction to the DTCP.

The under-discovery instruction may be sent by calling a DTCPReceiveListener listener interface.

S34: The DTCP of the target electronic device sends the under-discovery instruction to Nearby.

The DTCP may call a subscribe interface and a registerSocketListener interface to send the under-discovery instruction to Nearby.

Then, after receiving the BLE broadcast from the source electronic device, Nearby of the target electronic device may perform the following step:

S35: Nearby of the source electronic device sends a message for the discovered device to the service application.

Nearby may call an onDeviceFound interface to send the message to the service application.

S36: The service application of the source electronic device sends the to-be-shared file to the DTCP.

The to-be-shared file may be sent by calling a sendfile interface, and specifically, by calling sendFile (NearbyDevice recvDevice, int timeout, Uri[ ] fileUriList, and SendTransmitCallback transCallback).

S37: The DTCP of the source electronic device generates preview information such as a thumbnail.

S38: The DTCP of the source electronic device notifies Nearby to establish a P2P command channel.

Specifically, the DTCP may call an openNearbySocket interface to notify Nearby.

S39: Nearby of the source electronic device performs a BLE broadcast to Nearby of the target electronic device, to negotiate for the P2P command channel, for example, for a P2P version number.

S40: Nearby of the target electronic device sends a negotiation request to the DTCP.

The negotiation request may be sent by calling an onConnectRequest interface.

S41: The DTCP of the target electronic device is ready to receive a command.

S42: The DTCP of the target electronic device performs internal authentication, protocol negotiation, and the like with the DTCP of the source electronic device.

S43: The DTCP of the source electronic device notifies Nearby to establish a P2P data channel.

S44: Nearby of the source electronic device performs a BLE broadcast to Nearby of the target electronic device, to negotiate for the P2P data channel.

S45: Nearby of the target electronic device sends a negotiation request to the DTCP.

The negotiation request may be sent by calling an onConnectRequest interface.

S46: The DTCP of the target electronic device is ready to receive data.

S47: The DTCP of the source electronic device sends the preview information such as the thumbnail to the DTCP of the target electronic device through the data channel.

S48: The DTCP of the target electronic device sends the preview information to the service application for the user to check and confirm.

After the user performs a click operation on the target electronic device to confirm that the file is to be received, S49 is performed: The service application of the target electronic device sends receiving confirmation information to the DTCP S50: The DTCP of the target electronic device confirms, with the DTCP of the source electronic device through the command channel, that the file is to be received, and negotiates for a file transmission protocol.

S51: The DTCP of the source electronic device sends the to-be-shared file to the DTCP of the target electronic device through the data channel.

S52: The DTCP of the target electronic device receives the to-be-shared file, and stores the to-be-shared file into a specified path.

S53: The DTCP of the source electronic device calls back information such as a file sending progress and rate to the service application.

S54: The DTCP of the target electronic device calls back the information such as the file sending progress and rate to the service application.

The process in which the source electronic device sends the to-be-shared file to the target electronic device is completed through the foregoing process.

Figure 13:
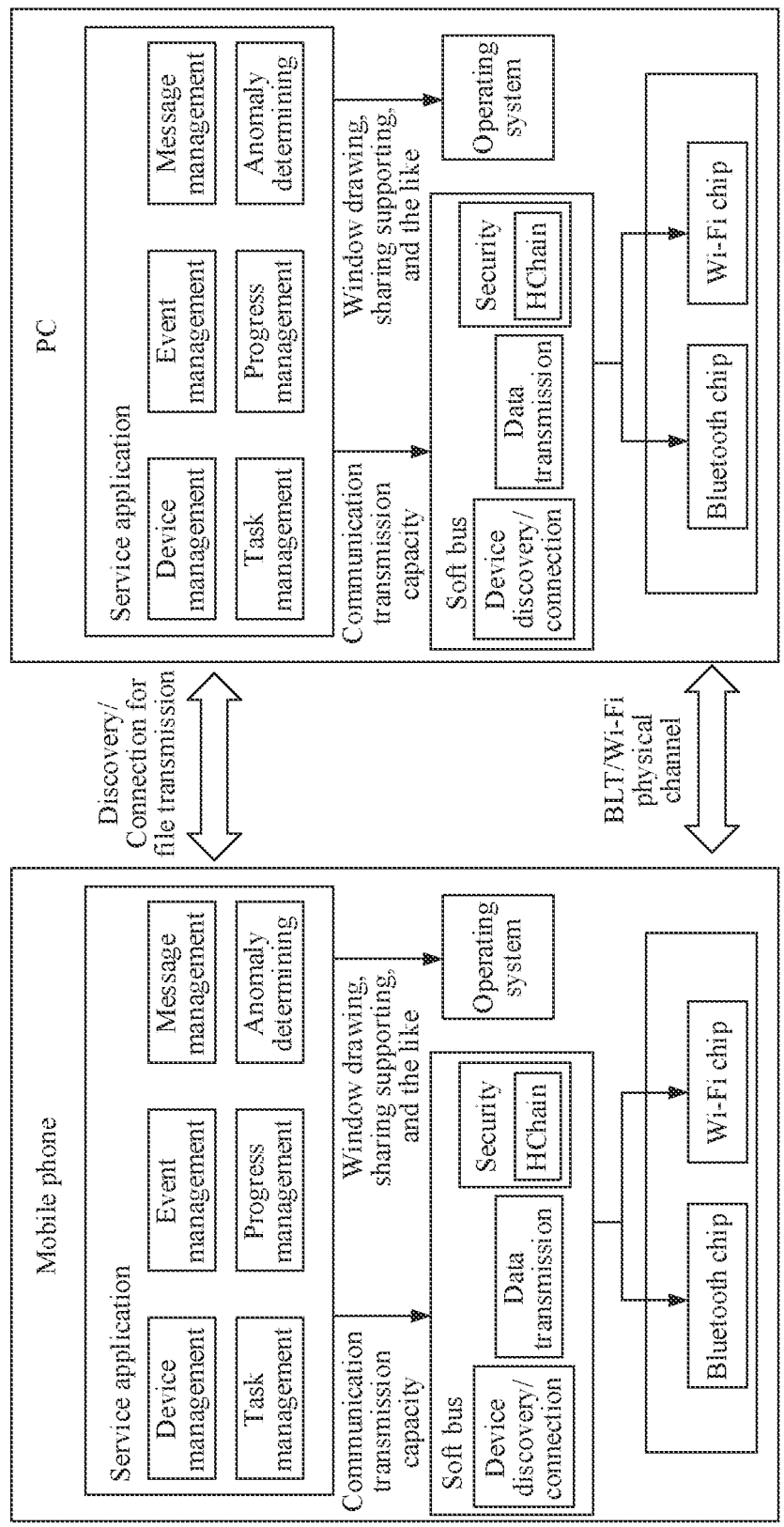
FIG. 13 is a schematic architectural diagram of sharing a file by an electronic device according to an embodiment of this application.
Figure 14A:
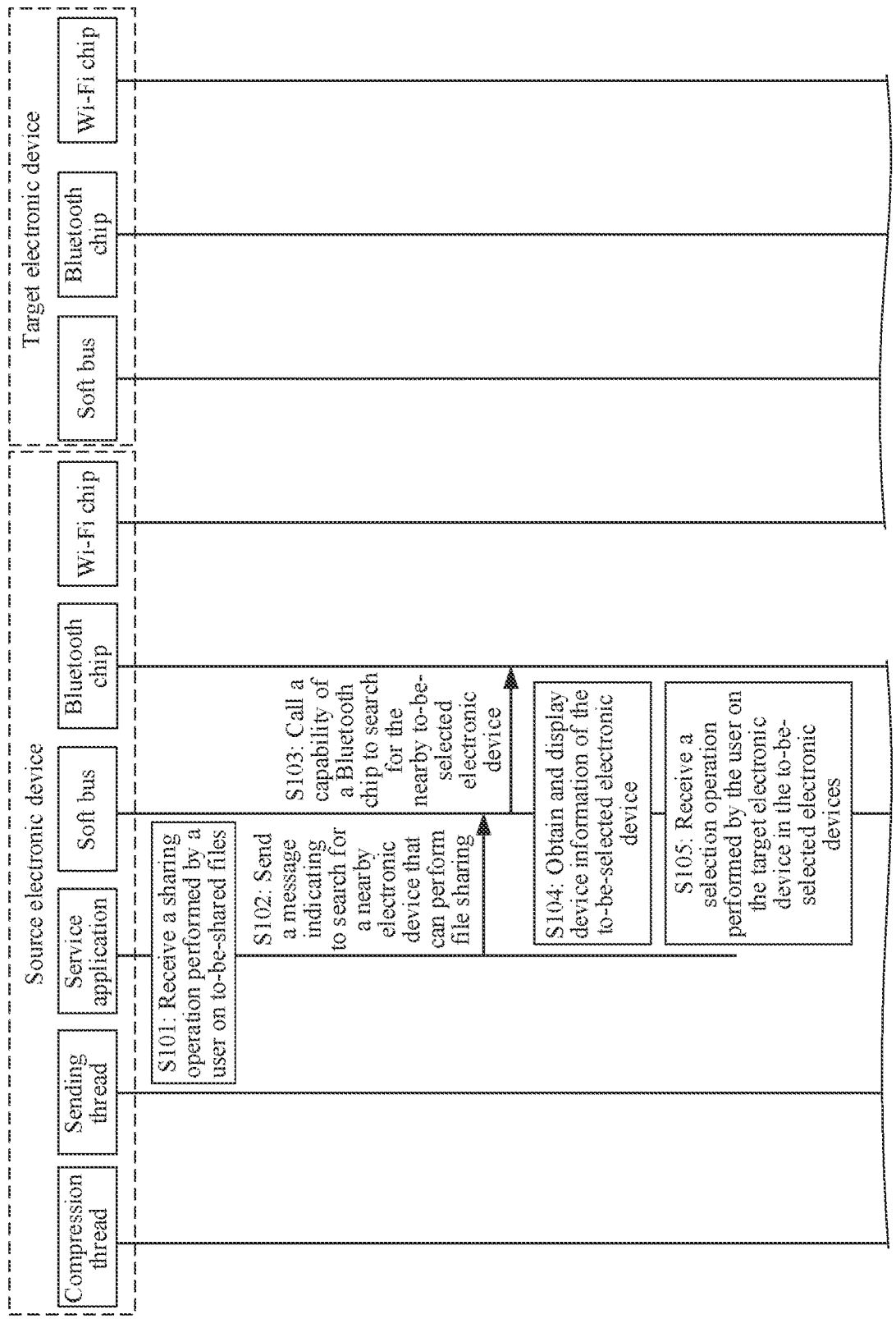
FIG. 14A and FIG. 14B are another schematic flowchart of sharing a file by an electronic device according to an embodiment of this application.
Figure 14B:
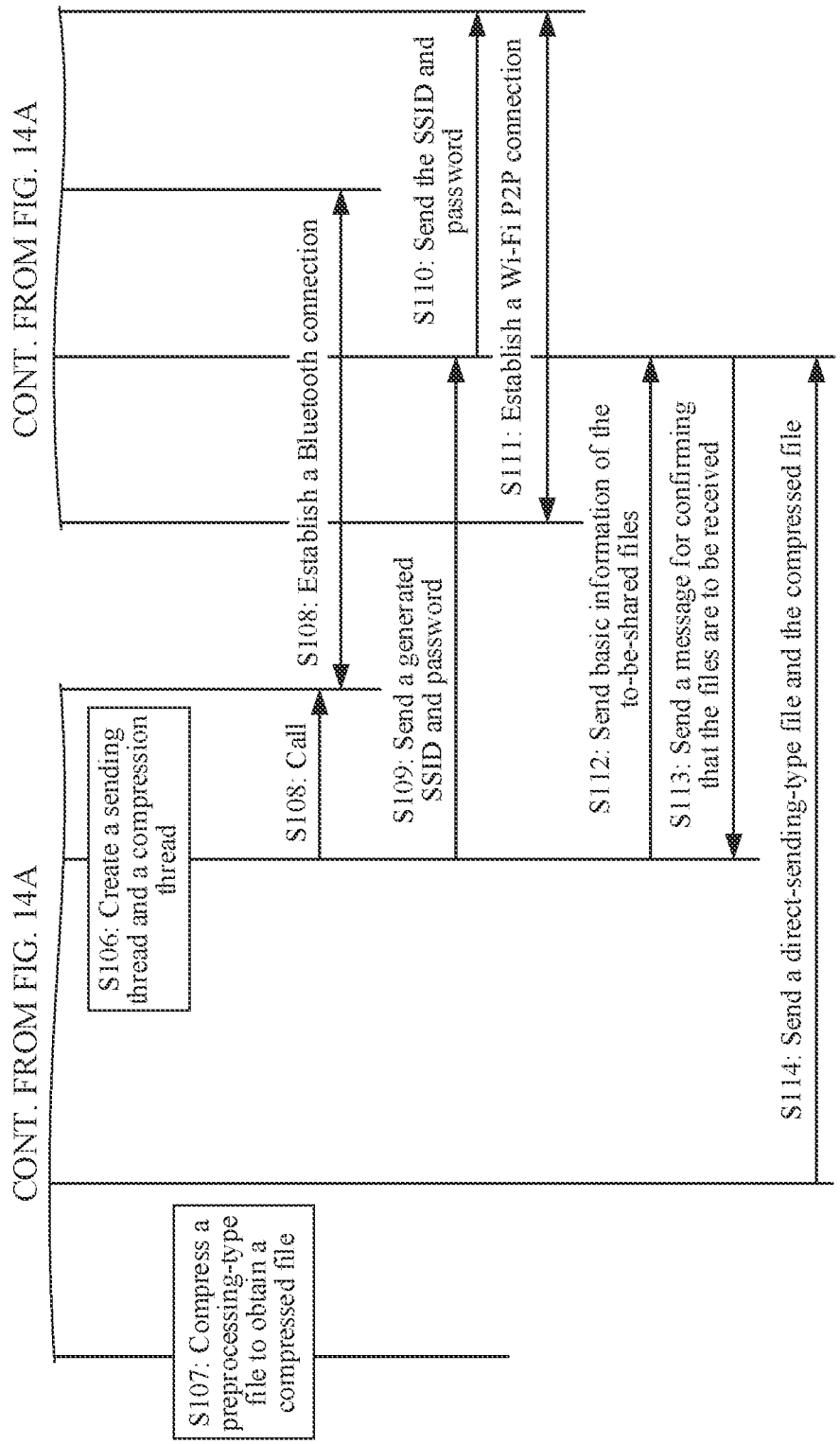

In an embodiment, the function of Nearby may alternatively be implemented by a soft bus. With reference to the block diagram of the software structure in FIG. 3, using an example in which the mobile phone sends a file to the PC, for an overall procedure architecture, refer to FIG. 13: An operating system of the mobile phone may be an Android system, and an operating system of the PC may be a Windows system. For a schematic flowchart of file sharing, refer to FIG. 14A and FIG. 14B. The method includes the following steps.

S101: A service application of a source electronic device receives a sharing operation performed by a user on to-be-shared files.

When the source electronic device is a PC, the service application may be a computer keeper APP. After the user selects multiple to-be-shared files in a folder and selects a "share" option, the computer keeper APP may receive the sharing operation. When the source electronic device is a mobile phone, the service application may be a file storage application, for example, a gallery application or a document application. After the user selects multiple to-be-shared files in a directory to which the to-be-shared files belong and taps a "share" option, the service application may receive the sharing operation.

S102: In response to the sharing operation, the service application sends, to a soft bus, a message indicating to search for a nearby electronic device that can perform file sharing.

After receiving the sharing operation, the service application may send an inter-process communication (inter-process communication, IPC) message to the soft bus. Optionally, the IPC message may carry a search indication instruction for indicating the soft bus to search for and discover the nearby electronic device that can perform file sharing. For ease of description, in this embodiment of this application, the device that can perform file sharing is referred to as a to-be-selected device.

S103: The soft bus calls a capability of a Bluetooth chip to search for the nearby to-be-selected electronic device.

S104: Obtain and display device information of the to-be-selected electronic device.

In this step, the soft bus calls the capability of the Bluetooth chip, in other words, performs a Bluetooth broadcast such as a BLE broadcast through the Bluetooth chip.

After receiving the broadcast signal, a nearby electronic device may send a feedback signal to the Bluetooth chip of the source electronic device, so that the soft bus obtains the device information of the nearby to-be-selected electronic device. Optionally, the obtained device information may include a device identifier, for example, a device name or a media access control address (media access control address, MAC address). In an embodiment, the soft bus may call a display driver to display the obtained device information on a display screen.

S105: The soft bus receives a selection operation performed by the user on one (namely, a target electronic device) of the to-be-selected electronic devices.

S106: The soft bus creates a sending thread and a compression thread.

The compression thread is used for compressing a part of the to-be-shared files, and the sending thread is used for sending a compressed file and the other part of the to-be-shared files to the target electronic device after a connection is established between the source electronic device and the target electronic device.

In an embodiment, the soft bus may classify the to-be-shared files according to a preset classification policy to determine which files need to be compressed and which files do not need to be compressed. The to-be-shared files may be classified into a direct-sending-type file and a preprocessing-type file. The direct-sending-type file is a file that can be directly sent to the target electronic device, and the preprocessing-type file is a file that needs to be compressed and packaged.

The preset classification policy may be a policy for performing classification according to file sizes and file types. In an implementation, refer to (a) in FIG. 15. A specific classification policy is as follows:

S60: Determine whether a file size of a to-be-shared file is less than a first threshold (for example, 5 KB); and if yes, perform S61: or if no, perform S62.

S61: Classify the to-be-shared file as a preprocessing-type file.

S62: Determine whether the file size is greater than a second threshold (for example, 60 MB); and if yes, perform S63; or if no, perform S64.

S63: Classify the to-be-shared file as a direct-sending-type file.

S64: Determine whether a file type of the to-be-shared file is a first type (for example: txt, xls, xlsx, xlt, xlsm, docx, doc, bmp, or apk); and if yes, perform S65; or if no, perform S66.

S65: Classify the to-be-shared file as a preprocessing-type file.

S66: Classify the to-be-shared file as a direct-sending-type file.

In another implementation, refer to (b) in FIG. 15. A specific classification policy is as follows:

S70: Determine whether a file type of a to-be-shared file is a first type; and if yes, perform S71: or if no, perform S72.

S71: Classify the to-be-shared file as a preprocessing-type file.

S72: Determine whether the file type is a second type (for example: pptx, ppt, png, jpg, mp3, mp4, pdf, rar, zip, 7z, avi, rmbv, mky, rm, or exe); and if yes, perform S73; or if no, perform S74.

S73: Classify the to-be-shared file as a direct-sending-type file.

S74: Determine whether a file size of the to-be-shared file is less than a first threshold; and if yes, perform S75; or if no, perform S76.

S75: Classify the to-be-shared file as a preprocessing-type file.

S76: Classify the to-be-shared file as a direct-sending-type file.

After classifying the to-be-shared files, the soft bus may also assign a classification mark to each to-be-shared file, and store a storage address and the classification mark of the to-be-shared file into a to-be-sent file queue. Alternatively, a storage address and a classification mark of the direct-sending-type file are stored into a direct-sending-type file queue, and a storage address and a classification mark of the preprocessing-type file are stored into a preprocessing-type file queue.

S107: The compression thread compresses the preprocessing-type file to obtain the compressed file.

The compression thread may start compressing the preprocessing-type file after the file classification, and prepare sending data for the sending thread, to reduce subsequent waiting time of the sending thread. For a specific compression process, refer to the following descriptions.

S108: The soft bus calls the capability of the Bluetooth chip to establish a Bluetooth connection to a Bluetooth chip of the target electronic device.

S109: The soft bus sends a generated service set identifier (service set identifier, SSID) and password to a soft bus of the target electronic device through a channel of the established Bluetooth connection, so that the target electronic device establishes a Wi-Fi P2P (peer to peer) connection to the source electronic device.

S110: The soft bus of the target electronic device sends the SSID and the password to a Wi-Fi chip.

S111: A Wi-Fi chip of the source electronic device establishes the Wi-Fi P2P connection to the Wi-Fi chip of the target electronic device.

The user may select one of the displayed to-be-selected electronic devices as the target electronic device, and then the soft bus may first call the Bluetooth capability to establish the Bluetooth connection to the target electronic device. After the Bluetooth connection is established, the soft bus may generate the SSID and the password, and call the Wi-Fi chip to establish a simulated hotspot (SoftAP), where the softAP correspondingly has the SSID and the password. Next, the soft bus may send the SSID and the password to the target electronic device through the channel of the established Bluetooth connection, so that the target electronic device establishes the Wi-Fi P2P connection to the source electronic device according to the received SSID and password. In addition, a socket data channel is also established between the source electronic device and the target electronic device for subsequent data transmission between the source electronic device and the target electronic device.

It should be noted that a type of the connection established between the source electronic device and the target electronic device is not limited to the Bluetooth connection and the Wi-Fi P2P connection, but may alternatively be a connection of another type, provided that the data transmission can be performed between the source electronic device and the target electronic device.

In an embodiment, the process of establishing the connection between the source electronic device and the target electronic device through S108 to S111 may alternatively be performed before S101, to be specific, after the user enables a file sharing function, the source electronic device may search for the nearby to-be-selected electronic devices, select, as the target electronic device, the electronic device with which the source electronic device expects to share the files, and establish the connection to the target electronic device. In this case, when the user selects the target electronic device again in the file sharing process in S105, because the connection to the target electronic device has been established, the source electronic device may directly perform the following file sending process.

S112: The soft bus sends basic information of the to-be-shared files to the target electronic device on the established data channel.

In the process of establishing the connection, the soft bus also obtains the basic information, such as file types, file sizes, and file thumbnails, of the to-be-shared files. Then, the basic information of the to-be-shared files is sent to the target electronic device after the data channel is established, and the user can preview the basic information on the target electronic device. In an embodiment, the soft bus of the target electronic device may be used for receiving the basic information of the to-be-shared files and sending the basic information to a service application, to display the basic information to the user.

S113: The soft bus receives a message sent by the target electronic device to confirm that the files are to be received.

After the target electronic device displays the basic information of the to-be-shared files to the user, the user may perform confirmation on the target electronic device. When receiving a confirmation operation that is input by the user, the target electronic device may send, to the source electronic device, the message for confirming that the files are to be received.

S114: The sending thread sends the direct-sending-type file and the compressed file to the target electronic device through the data channel.

Because the compression thread has compressed the preprocessing-type file, the sending thread may send the direct-sending-type file and the obtained compressed file to the target device. It should be noted that the process of S106 and S107 may be performed simultaneously with the process of S108 to S111, in other words, the processing process performed by the compression thread may be performed concurrently with the process of establishing the connection between the source electronic device and the target electronic device, to reduce mutual waiting time. Alternatively, the process of S106 and S107 may be performed after the process of S108 to S1. This is not limited in this embodiment of this application.

Execution processes of the sending thread and the compression thread are described in detail in the following embodiment:

Execution by the sending thread and the compression thread are concurrent, to be specific, after the communication connection is established between the source electronic device and the target electronic device, the sending thread may send the direct-sending-type file to the target electronic device while the compression thread compresses the preprocessing-type file. However, considering a high demand for file sending in an actual scenario, a priority of the sending thread may be set to be higher than that of the compression thread herein.

In an embodiment, when the storage address and the classification mark of the direct-sending-type file are stored into the direct-sending-type file queue, and the storage address and the classification mark of the preprocessing-type file are stored into the preprocessing-type file queue, as shown in FIG. 16, the source electronic device may send the to-be-sent files to the target electronic device by using the following first sending policy after receiving the message sent by the target electronic device for confirming that the files are to be received:

S80: The sending thread obtains the storage address of the direct-sending-type file from the direct-sending-type file queue.

S81: Obtain the direct-sending-type file according to the storage address.

S82: Send the direct-sending-type file to the target electronic device.

S83: The compression thread obtains the storage address of the preprocessing-type file from the preprocessing-type file queue.

S84: Obtain the preprocessing-type file according to the storage address.

S85: Remove the storage addresses of the obtained files.

After obtaining the storage address of the preprocessing-type file from the preprocessing-type file queue, the compression thread may remove the corresponding storage address and classification mark from the preprocessing-type file queue, to avoid obtaining the storage address repeatedly.

S86: Compress and package the preprocessing-type file to obtain the compressed file.

Optionally, the compressed files obtained by compressing the preprocessing-type file by the compression thread may be a file in a binary format or a file in another format. In this case, the compression thread may further store the compressed file, to obtain a storage address of the compressed file.

S87: Store the storage address of the compressed file into the direct-sending-type file queue, so that the sending thread obtains the storage address of the compressed file from the direct-sending-type file queue, and sends the compressed file to the target electronic device.

Steps S80 to S82 are performed simultaneously with steps S83 to S87. In an embodiment, the compression thread may store the compressed file in a same directory as the original preprocessing-type file or in another directory. It should be noted that after sending the direct-sending-type file and the compressed file to the target electronic device, the sending thread may further perform the following step:

S88: Remove the storage addresses of the sent files.

In an implementation, the compression thread may sequentially obtain a storage address of one preprocessing-type file from the preprocessing-type file queue, to be specific, first obtain a storage address of a preprocessing-type file 1, then obtain the preprocessing-type file 1 according to the storage address, and compress the preprocessing-type file 1. Then, the compression thread obtains a storage address of a preprocessing-type file 2, obtains the preprocessing-type file 2 according to the storage address, and compresses the preprocessing-type file 2. The rest can be deduced by analogy. In another implementation, the compression thread may sequentially obtain storage addresses of a first preset quantity (for example, 3 or another quantity) of preprocessing-type files from the preprocessing-type file queue, to be specific, first obtain storage addresses of three preprocessing-type files 1, 2, and 3, then obtain the corresponding preprocessing-type files 1, 2, and 3 according to the storage addresses, and compress the preprocessing-type files 1, 2, and 3. Then, the compression thread obtains storage addresses of three preprocessing-type files 4, 5, and 6, obtains the corresponding preprocessing-type files 4, 5, and 6 according to the storage addresses, and compresses the preprocessing-type files 4, 5, and 6. The rest can be deduced by analogy. After obtaining a second preset quantity (for example, 5) of compressed files through compression, the compression thread may store these compressed files, and store storage addresses into the foregoing direct-sending-type file queue for the sending thread to send. Alternatively, the compression thread may package these compressed files, and store a storage address of a final packaged file into the foregoing direct-sending-type file queue.

In this embodiment, the priority of the sending thread is higher than that of the compression thread, in other words, it is necessary to ensure that the sending thread is always in a working state, to minimize the waiting time of the sending thread. In this case, in an implementation, if a quantity of files in the direct-sending-type file queue is less than a third preset quantity (in other words, a quantity of remaining direct-sending-type files that are unsent is less than the third preset quantity), the compression thread no longer obtains storage addresses of remaining preprocessing-type files from the preprocessing-type file queue, but moves the storage addresses of these remaining preprocessing-type files from the preprocessing-type file queue to the direct-sending-type file queue, and then the sending thread directly sends these remaining preprocessing-type files to the target electronic device, to avoid a case in which the sending thread can perform sending only after waiting for the compression thread to complete compressing the preprocessing-type files. In another implementation, if a quantity of files in the direct-sending-type file queue and a quantity of files in the preprocessing-type file queue are both 0, but the compression thread has not completed compressing obtained preprocessing-type files, the compression thread may stop the compression, and move storage addresses of all the obtained preprocessing-type files into the direct-sending-type file queue for the sending thread to send. Alternatively, the compression thread moves storage addresses of a compressed file and the uncompressed preprocessing-type files into the direct-sending-type file queue for the sending thread to send.

For example, it is assumed that the third preset quantity is 3, the quantity of files in the direct-sending-type file queue is 2 (the direct-sending-type file queue includes two direct-sending-type files), and the quantity of files in the preprocessing-type file queue is 2 (the preprocessing-type file queue includes two preprocessing-type files). In this case, the compression thread no longer obtains storage addresses of the two preprocessing-type files in the preprocessing-type file queue for compression, but moves the storage addresses of the two preprocessing-type files into the direct-sending-type file queue; and the sending thread directly sends the four files (including two direct-sending-type files and two preprocessing-type files) to the target electronic device.

For another example, it is assumed that the quantity of files in the direct-sending-type file queue and the quantity of files in the preprocessing-type file queue are both 0; and the compression thread previously obtains storage addresses of three preprocessing-type files 4, 5, and 6, has completed compressing the preprocessing-type file 4, and has not compressed the preprocessing-type files 5 and 6. In this case, the compression thread may move the storage addresses of the preprocessing-type files 4, 5, and 6 into the direct-sending-type file queue. Alternatively, the compression thread moves a storage address of a compressed file corresponding to the preprocessing-type file 4 and the storage addresses of the preprocessing-type files 5 and 6 into the direct-sending-type file queue.

In addition, in this embodiment, when the sending thread sends the files to the target electronic device, a status of the data channel used to transmit the files changes due to impact of current usage performance of the source electronic device. For example, sometimes a file sending rate is high, while sometimes the file sending rate is low. For this case, the first sending policy may be dynamically adjusted in this embodiment of this application to maximize performance of the sending thread.

In an implementation, during file sending, the sending thread may obtain a current sending rate. If the current sending rate is less than a preset rate threshold, it indicates that the current file rate of the sending thread is low, and time needed to send a file of a same size is correspondingly long. In this case, the soft bus may re-mark direct-sending-type files that are still in the direct-sending-type file queue currently. For example, files whose file sizes are greater than a second threshold (for example, 60 MB) but less than a third threshold (for example, 100 MB) are marked as preprocessing-type files, and storage addresses of these preprocessing-type files are moved from the direct-sending-type file queue to the preprocessing-type file queue. Another file whose file size is greater than or equal to the third threshold is still a direct-sending-type file, and a corresponding storage address is still kept in the direct-sending-type file queue. This reduces a quantity of direct-sending-type files, and reduces pressure on the sending thread when the sending rate is low.

If the current sending rate is greater than or equal to the preset rate threshold, it indicates that the current file rate of the sending thread is high, and time needed to send a file of a same size is short. In this case, the soft bus may re-mark preprocessing-type files that are still in the preprocessing-type file queue currently. For example, files whose file sizes are greater than or equal to a fourth threshold (for example, 3 KB) but less than a first threshold (for example, 5 KB) are marked as direct-sending-type files. Storage addresses of these direct-sending-type files are moved from the preprocessing-type file queue to the direct-sending-type file queue. Another file whose file size is less than the fourth threshold is still a preprocessing-type file, and a corresponding storage address is still kept in the preprocessing-type file queue. This increases a quantity of direct-sending-type files, to send a file quickly when the sending rate is high.

In another implementation, when classifying the to-be-shared files according to a preset first classification policy, the soft bus may first classify a preset proportion (for example, 20%) of the to-be-shared files, then classify remaining to-be-shared files according to a sending rate when the sending thread sends the files, store a storage address and a classification mark of a direct-sending-type file into the direct-sending-type file queue, and store a storage address and a classification mark of a preprocessing-type file into the preprocessing-type file queue. For example, the soft bus first classifies the preset proportion of the to-be-shared files according to the preset classification policy. Then, during file sending, if a current sending rate is less than a preset rate threshold, a file whose file size is less than a first threshold (for example, 5 KB) in the remaining to-be-shared files is classified as a preprocessing-type file, and a corresponding storage address is stored into the preprocessing-type file queue. A file whose file size is greater than a third threshold (for example, 100 MB) is classified as a direct-sending-type file, and a corresponding storage address is stored into the direct-sending-type file queue. A file whose file size is between [the first threshold, the third threshold] is further classified according to a file type. This reduces a quantity of direct-sending-type files, and reduces pressure on the sending thread when the sending rate is low. If the current sending rate is greater than or equal to the preset rate threshold, a file whose file size is less than the first threshold (for example, 5 KB) in the remaining to-be-shared files is classified as a preprocessing-type file, and a corresponding storage address is stored into the preprocessing-type file queue. A file whose file size is greater than a fourth threshold (for example, 50 MB) is classified as a direct-sending-type file, and a corresponding storage address is stored into the direct-sending-type file queue. A file whose file size is between [the first threshold, the fourth threshold] is further classified according to a file type. This increases a quantity of direct-sending-type files, to send a file quickly when the sending rate is high. It should be noted that when classifying the remaining to-be-shared files, the soft bus may classify all the remaining to-be-shared files, or classify a preset proportion of the remaining to-be-shared files, and classify a remaining to-be-shared file according to a sending rate after a preset time interval, and the rest can be deduced by analogy.

In still another implementation, the sending thread may estimate, according to a current sending rate and a total size of a remaining direct-sending-type file in the direct-sending-type file queue, first time needed to send the remaining direct-sending-type file. Furthermore, the compression thread may estimate, according to a type and a size of a remaining preprocessing-type file in the preprocessing-type file queue, second time needed to compress the remaining preprocessing-type file. If the second time is greater than the first time, it indicates that the time needed by the compression thread is greater than that needed by the sending thread. This may cause the sending thread to wait. In this case, the compression thread may stop the compression; or compress only a part of the remaining preprocessing-type files, and move a storage address of a preprocessing-type file that is not to be compressed from the preprocessing-type file queue to the direct-sending-type file queue, so that the sending thread directly sends the part of the remaining preprocessing-type files. It should be noted that a method for classifying the to-be-shared files by the soft bus according to the classification policy, a method for estimating, by the sending thread, the time needed for sending the direct-sending-type file, and a method for estimating, by the compression thread, the time needed for compressing the preprocessing-type file can be determined through exhaustive experiments. For example, for some data of the exhaustive experiment for classifying the to-be-shared files, refer to FIG. 17.

In an embodiment, when the storage addresses and the classification marks of the to-be-shared files are stored into the to-be-sent file queue, as shown in FIG. 18, the source electronic device may send the to-be-sent files to the target electronic device by using the following second sending policy:

S90: The sending thread obtains the storage address of the direct-sending-type file from the to-be-sent file queue.

S91: Obtain the direct-sending-type file according to the storage address.

S92: Send the direct-sending-type file to the target electronic device.

S93: The compression thread obtains the storage address of the preprocessing-type file from the to-be-sent file queue.

S94: Obtain the preprocessing-type file according to the storage address.

S95: Remove the storage addresses of the obtained files.

After obtaining the storage address of the preprocessing-type file from the to-be-sent file queue, the compression thread may remove the corresponding storage address and classification mark from the to-be-sent file queue, to avoid obtaining the storage address repeatedly by the sending thread.

S96: Compress and package the preprocessing-type file to obtain the compressed file.

In this case, the compression thread may store the compressed file, to obtain a storage address of the compressed file.

S97: Continue to store the storage address of the compressed file into the to-be-sent file queue, so that the sending thread obtains the storage address of the compressed file from the to-be-sent file queue, and sends the compressed file to the target electronic device.

Steps S90 to S92 are performed simultaneously with steps S93 to S97. In an embodiment, the compression thread may store the compressed file in a same directory as the original preprocessing-type file or in another directory. It should be noted that after sending the direct-sending-type file and the compressed file to the target electronic device, the sending thread may further perform the following step:

S98: Remove the storage addresses of the sent files.

In an implementation, the compression thread may sequentially obtain a storage address of one preprocessing-type file from the to-be-sent file queue, to be specific, first obtain a storage address of a preprocessing-type file 1, then obtain the preprocessing-type file 1 according to the storage address, and compress the preprocessing-type file 1. Then, the compression thread obtains a storage address of a preprocessing-type file 2, obtains the preprocessing-type file 2 according to the storage address, and compresses the preprocessing-type file 2. The rest can be deduced by analogy. In another implementation, the compression thread may sequentially obtain storage addresses of a first preset quantity (for example, 3 or another quantity) of preprocessing-type files from the to-be-sent file queue, to be specific, first obtain storage addresses of three preprocessing-type files 1, 2, and 3, then obtain the corresponding preprocessing-type files 1, 2, and 3 according to the storage addresses, and compress the preprocessing-type files 1, 2, and 3. Then, the compression thread obtains storage addresses of three preprocessing-type files 4, 5, and 6, obtains the corresponding preprocessing-type files 4, 5, and 6 according to the storage addresses, and compresses the preprocessing-type files 4, 5, and 6. The rest can be deduced by analogy. After obtaining a second preset quantity (for example, 5) of compressed files through compression, the compression thread may store these compressed files, and store storage addresses into the to-be-sent file queue for the sending thread to send. Alternatively, the compression thread may package these compressed files, and store a storage address of a final packaged file into the to-be-sent file queue.

In this embodiment, the priority of the sending thread is higher than that of the compression thread, in other words, it is necessary to ensure that the sending thread is always in a working state, to minimize the waiting time of the sending thread. In this case, in an implementation, if a quantity of files in the to-be-sent file queue is less than a third preset quantity (in other words, a quantity of remaining files that are unsent is less than the third preset quantity), the compression thread no longer obtains storage addresses of preprocessing-type files from the to-be-sent file queue. The sending thread directly sends these preprocessing-type files to the target electronic device, to avoid a case in which the sending thread can perform sending only after waiting for the compression thread to complete compressing the preprocessing-type files. In another implementation, if a quantity of files in the to-be-sent file queue is 0, but the compression thread has not completed compressing obtained preprocessing-type files, the compression thread may stop the compression, and store storage addresses of all the obtained preprocessing-type files into the to-be-sent file queue for the sending thread to send. Alternatively, the compression thread stores storage addresses of a compressed file and the uncompressed preprocessing-type files into the to-be-sent file queue for the sending thread to send.

For example, it is assumed that the third preset quantity is 5, and the quantity of files in the to-be-sent file queue is 4 (the to-be-sent file queue includes two direct-sending-type files and two preprocessing-type files). In this case, the compression thread no longer obtains storage addresses of the two preprocessing-type files for compression, but the sending thread directly sends the four files to the target electronic device.

For another example, it is assumed that the quantity of files in the to-be-sent file queue is 0; and the compression thread previously obtains storage addresses of three preprocessing-type files 4, 5, and 6, has completed compressing the preprocessing-type file 4, and has not compressed the preprocessing-type files 5 and 6. In this case, the compression thread may store the storage addresses of the preprocessing-type files 4, 5, and 6 into the to-be-sent file queue again. Alternatively, the compression thread stores a storage address of a compressed file corresponding to the preprocessing-type file 4 and the storage addresses of the preprocessing-type files 5 and 6 into the to-be-sent file queue.

In addition, in this embodiment, when the sending thread sends the files to the target electronic device, a status of the data channel used to transmit the files changes. For example, sometimes a file sending rate is high, while sometimes the file sending rate is low. For this case, the second sending policy may be dynamically adjusted in this embodiment of this application to maximize performance of the sending thread.

In an implementation, during file sending, the sending thread may obtain a current sending rate. If the current sending rate is less than a preset rate threshold, it indicates that the current file rate of the sending thread is low, and time needed to send a file of a same size is correspondingly long. In this case, the soft bus may re-mark direct-sending-type files that are still in the to-be-sent file queue currently. For example, files whose file sizes are greater than a second threshold (for example, 60 MB) but less than a third threshold (for example, 100 MB) are marked as preprocessing-type files. Another file whose file size is greater than or equal to the third threshold is still a direct-sending-type file. This reduces a quantity of direct-sending-type files, and reduces pressure on the sending thread when the sending rate is low.

If the current sending rate is greater than or equal to the preset rate threshold, it indicates that the current file rate of the sending thread is high, and time needed to send a file of a same size is short. In this case, the soft bus may re-mark preprocessing-type files that are still in the to-be-sent file queue currently. For example, files whose file sizes are greater than or equal to a fourth threshold (for example, 3 KB) but less than a first threshold (for example, 5 KB) are marked as direct-sending-type files. Another file whose file size is less than the fourth threshold is still a preprocessing-type file. This increases a quantity of direct-sending-type files, to send a file quickly when the sending rate is high.

In another implementation, when classifying the to-be-shared files according to the preset classification policy, the soft bus may first classify a preset proportion (for example, 20%) of the to-be-shared files, then classify remaining to-be-shared files according to a sending rate when the sending thread sends the files, and store storage addresses and classification marks of the classified to-be-shared files into the to-be-sent file queue. For example, the soft bus first classifies the preset proportion of the to-be-shared files according to the preset classification policy. Then, during file sending, if a current sending rate is less than a preset rate threshold, a file whose file size is less than a first threshold (for example, 5 KB) in the remaining to-be-shared files is classified as a preprocessing-type file. A file whose file size is greater than a third threshold (for example, 100 MB) is classified as a direct-sending-type file. A file whose file size is between [the first threshold, the third threshold] is classified according to a file type. This reduces a quantity of direct-sending-type files, and reduces pressure on the sending thread when the sending rate is low. If the current sending rate is greater than or equal to the preset rate threshold, a file whose file size is less than the first threshold (for example, 5 KB) in the remaining to-be-shared files is classified as a preprocessing-type file. A file whose file size is greater than a fourth threshold (for example, 50 MB) is classified as a direct-sending-type file. A file whose file size is between [the first threshold, the fourth threshold] is classified according to a file type. This increases a quantity of direct-sending-type files, to send a file quickly when the sending rate is high. It should be noted that when classifying the remaining to-be-shared files, the soft bus may classify all the remaining to-be-shared files; or classify a preset proportion of the remaining to-be-shared files, and classify a remaining to-be-shared file according to a sending rate after a preset time interval, and the rest can be deduced by analogy.

In still another implementation, the sending thread may estimate, according to a current sending rate and a total size of a remaining direct-sending-type file, first time needed to send the remaining direct-sending-type file. Furthermore, the compression thread may estimate, according to a type and a size of a remaining preprocessing-type file, second time needed to compress the remaining preprocessing-type file. If the second time is greater than the first time, it indicates that the time needed by the compression thread is greater than that needed by the sending thread. This may cause the sending thread to wait. In this case, the compression thread may stop the compression, or compress only a part of the remaining preprocessing-type files, and the sending thread directly sends a remaining part of the remaining preprocessing-type files.

In an embodiment, as shown in FIG. 19, a process in which the target electronic device receives the to-be-shared files may include the following steps.

S1001: A receiving thread receives the to-be-shared files (which may be referred to as received files in this case).

S1002: Store the received files into corresponding storage addresses.

S1003: The receiving thread determines whether there is a compressed file in the received files.

If yes, S1004 is performed: Write a storage address of the compressed file into a postprocessing queue.

S1005: A postprocessing thread obtains the storage address of the compressed file from the postprocessing queue.

S1006: Obtain the corresponding compressed file according to the storage address.

S1007: Decompress the compressed file to obtain a decompressed file.

S1008: Store the decompressed file into a storage address corresponding to the received file.

In an embodiment, in a process in which the source electronic device sends the files to the target electronic device, to help the user to check a sending progress, display words such as "10% sent" may be displayed on the source electronic device, and display words such as "10% received" may be displayed on the target electronic device. Specific display content is not limited in this embodiment of this application.

According to the file sharing method, when sharing the multiple files with the target electronic device, the source electronic device may classify the multiple files into the direct-sending-type file and the preprocessing-type file according to factors such as the types and the sizes of the files, then start one sending thread to directly send the direct-sending-type file to the target electronic device, start one compression thread to compress the preprocessing-type file, and send the compressed file to the target electronic device through the sending thread. This can reduce a data amount of the shared files, to improve sharing efficiency. In addition, the concurrent execution by the two threads also improves the file sharing efficiency.

The file sharing method provided in the embodiments of this application is described above, and is described below by using another embodiment. FIG. 20 is another schematic flowchart of a file sharing method according to an embodiment of this application. The method is applied to a source electronic device, and includes the following steps.

S201: A source electronic device receives a sharing operation performed by a user on to-be-shared files.

S202: Establish a communication connection to a target electronic device in response to the sharing operation.

S203: Classify the to-be-shared files to obtain a direct-sending-type file and a preprocessing-type file.

S204: Call a compression thread to compress the preprocessing-type file, to obtain a compressed file.

S205: Call a sending thread to send the direct-sending-type file and the compressed file to the target electronic device through a data channel of the communication connection.

Steps S203 and S204 may be performed simultaneously with S202, and steps S204 and S205 may be performed concurrently. For a specific implementation process of steps S201 to S205, refer to the descriptions of the foregoing embodiment. In some other embodiments of this application, the foregoing file sharing method may alternatively include more or fewer steps than those shown in the figure. Details are not described herein.

The foregoing describes in detail the examples of the file sharing method provided in the embodiments of this application. It may be understood that to implement the foregoing functions, the electronic device includes corresponding hardware and/or software modules for performing the functions. A person skilled in the art should be easily aware that, in combination with the units and algorithm steps of the examples described in the embodiments disclosed in this specification, this application can be implemented by hardware or a combination of hardware and computer software. Whether a specific function is performed by hardware or computer software driving hardware depends on particular applications and design constraints of the technical solutions. A person skilled in the art may use different methods to implement the described functions with reference to embodiments for each particular application, but it should not be considered that the implementation goes beyond the scope of this application.

In the embodiments of this application, the electronic device may be divided into the functional modules according to the foregoing method examples. For example, each functional module, for example, a detection unit, a processing unit, and a display unit, may be obtained through division according to each function, or two or more functions may be integrated into one module. The integrated module may be implemented in a form of hardware, or may be implemented in a form of a software functional module. It should be noted that in the embodiments of this application, the division into the modules is an example, and is merely logical function division, and there may be other division manners during actual implementation.

It should be noted that all related content of the steps in the foregoing method embodiments may be referenced to function descriptions of corresponding functional modules. Details are not described herein again.

The electronic device provided in the embodiments is configured to perform the foregoing file sharing method, to achieve the same effects as the foregoing methods.

When an integrated unit is used, the electronic device may further include a processing module, a storage module, and a communication module. The processing module may be configured to control and manage an action of the electronic device. The storage module may be configured to support the electronic device in storing program code, data, and the like. The communication module may be configured to support communication between the electronic device and another device.

The processing module may be a processor or a controller. The processing module may implement or execute various examples of logical blocks, modules, and circuits described with reference to content disclosed in this application. The processor may alternatively be a combination for implementing computing functions, for example, a combination of one or more microprocessors, a combination of a digital signal processor (digital signal processing, DSP) and a microprocessor, or the like. The storage module may be a memory. The communication module may be specifically a device, for example, a radio frequency circuit, a Bluetooth chip, or a Wi-Fi chip, that interacts with another electronic device.

In an embodiment, when the processing module is the processor and the storage module is the memory, the electronic device in the embodiments may be a device having the structure shown in FIG. 1 or FIG. 2.

An embodiment of this application further provides a computer-readable storage medium. The computer-readable storage medium stores a computer program, and the computer program, when executed by a processor, causes the processor to perform the file sharing method in any one of the foregoing embodiments.

An embodiment of this application further provides a computer program product. When the computer program product runs on a computer, the computer is caused to perform the relevant steps, to implement the file sharing method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to cause the chip to perform the file sharing method in the foregoing method embodiments.

The electronic device, the computer-readable storage medium, the computer program product, or the chip provided in the embodiments may be configured to perform the corresponding method provided above. Therefore, for beneficial effects that can be achieved, refer to the beneficial effects in the corresponding method provided above. Details are not described herein again.

Based on the foregoing descriptions of the implementations, a person skilled in the art may clearly understand that, for the purpose of convenient and brief description, division into the foregoing functional modules is taken as an example for illustration. During actual application, the foregoing functions may be allocated to different functional modules for implementation according to a requirement, that is, an inner structure of an apparatus is divided into different functional modules to implement all or some of the functions described above.

In the several embodiments provided in this application, it should be understood that the disclosed apparatus and method may be implemented in other manners. For example, the foregoing apparatus embodiments are only examples. For example, division into the modules or units is only logical function division, and may be another division manner during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, in other words, may be located in one place, or may be distributed in multiple different places. Some or all of the units may be selected according to an actual requirement to achieve the objectives of the solutions of the embodiments.

In addition, functional units in the embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions in the embodiments of this application essentially, the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in the embodiments of this application. The storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A file sharing method, wherein the method is applied to a first electronic device, and comprises:
    displaying a first interface comprising an identifier of a second electronic device;
    establishing a communication connection to the second electronic device when receiving a first operation that is on the first interface and that is performed by a user on the identifier of the second electronic device, wherein the second electronic device is configured to receive multiple to-be-shared files sent by the first electronic device;
    creating a first thread and a second thread;
    calling the first thread to sequentially compress a first-type file in the multiple to-be-shared files to obtain a compressed file; and
    calling the second thread to send a second-type file in the multiple to-be-shared files and the obtained compressed file to the second electronic device through a data channel corresponding to the communication connection, wherein the first-type file and the second-type file are obtained by classifying the multiple to-be-shared files according to a preset classification policy, the first-type file is a file that needs to be compressed, and the second-type file is a file to be directly sent to the second electronic device;
    wherein execution by the first thread and the second thread is concurrent.

2. The method according to claim 1, wherein the method further comprises:
    storing a storage address of the first-type file into a first queue; and
    the calling the first thread to sequentially compress the first-type file to obtain the compressed file comprises:
    calling the first thread to sequentially read the storage address of the first-type file from the first queue;
    obtaining data of the first-type file according to the storage address of the first-type file; and
    compressing the data of the first-type file to obtain the compressed file.

3. The method according to claim 2, wherein the calling the first thread to sequentially read the storage address of the first-type file from the first queue comprises:
    calling the first thread to sequentially read storage addresses of a preset quantity of first-type files from the first queue; and
    correspondingly, the compressing the data of the first-type file to obtain the compressed file comprises:
    sequentially compressing data of the preset quantity of first-type files to obtain the compressed file.

4. The method according to claim 2, wherein after the compressed file is obtained, the method further comprises:
    calling the first thread to store the compressed file to obtain a storage address of the compressed file; and
    storing the storage address of the compressed file into a second queue, wherein the second queue stores a storage address of the second-type file.

5. The method according to claim 4, wherein the calling the second thread to send the second-type file and the obtained compressed file to the second electronic device comprises:
    calling the second thread to read the storage address of the second-type file and the storage address of the obtained compressed file from the second queue;
    obtaining data of the second-type file according to the storage address of the second-type file;
    obtaining data of the obtained compressed file according to the storage address of the obtained compressed file; and
    sending the data of the second-type file and the data of the obtained compressed file to the second electronic device.

6. The method according to claim 5, wherein during the concurrent execution by the first thread and the second thread, if a quantity of files corresponding to storage addresses in the second queue is less than a preset threshold, the method further comprises:
    reading a first storage address in the first queue, storing the first storage address into the second queue, and deleting the first storage address from the first queue, wherein the first storage address is a storage address of a first-type file that has not been compressed in the first queue.

7. The method according to claim 1, wherein after the establishing a communication connection to the second electronic device, the method further comprises:
    sending a first message to the second electronic device, wherein the first message notifies the second electronic device to receive the files; and
    receiving a message sent by the second electronic device according to the first message to confirm that the files are to be received.

8. The method according to claim 7, wherein the first message carries at least one type of file types, file sizes, and file brief information of the multiple to-be-shared files.

9. The method according to claim 1, wherein the classification policy is a policy for performing classification according to the file sizes and/or the file types of the to-be-shared files.

10. The method according to claim 1, wherein the method further comprises:
    displaying a second interface comprising identifiers of the multiple to-be-shared files; and
    displaying the first interface when receiving a second operation that is on the second interface and that is performed by the user on the identifiers of the multiple to-be-shared files.

11. An electronic device, comprising:
    one or more processors; and
    one or more memories, wherein the memory stores one or more programs, and the one or more programs, when executed by the processor, cause the electronic device to perform a file sharing method, wherein the method is applied to a first electronic device, and comprises:
    displaying a first interface comprising an identifier of a second electronic device;
    establishing a communication connection to the second electronic device when receiving a first operation that is on the first interface and that is performed by a user on the identifier of the second electronic device, wherein the second electronic device is configured to receive multiple to-be-shared files sent by the first electronic device;
    creating a first thread and a second thread;
    calling the first thread to sequentially compress a first-type file in the multiple to-be-shared files to obtain a compressed file; and
    calling the second thread to send a second-type file in the multiple to-be-shared files and the obtained compressed file to the second electronic device through a data channel corresponding to the communication connection, wherein the first-type file and the second-type file are obtained by classifying the multiple to-beshared files according to a preset classification policy, the first-type file is a file that needs to be compressed, and the second-type file is a file to be directly sent to the second electronic device;

wherein execution by the first thread and the second thread is concurrent.

12. The electronic device according to claim 11, wherein the file sharing method further comprises:

storing a storage address of the first-type file into a first queue; and the calling the first thread to sequentially compress the first-type file to obtain the compressed file comprises:

calling the first thread to sequentially read the storage address of the first-type file from the first queue;

obtaining data of the first-type file according to the storage address of the first-type file; and compressing the data of the first-type file to obtain the compressed file.

13. The electronic device according to claim 12, wherein the calling the first thread to sequentially read the storage address of the first-type file from the first queue comprises:

calling the first thread to sequentially read storage addresses of a preset quantity of first-type files from the first queue; and correspondingly, the compressing the data of the first-type file to obtain the compressed file comprises:

sequentially compressing data of the preset quantity of first-type files to obtain the compressed file.

14. The electronic device according to claim 13, wherein after the compressed file is obtained, the method further comprises:

calling the first thread to store the compressed file to obtain a storage address of the compressed file; and storing the storage address of the compressed file into a second queue, wherein the second queue stores a storage address of the second-type file.

15. The electronic device according to claim 12, wherein after the compressed file is obtained, the method further comprises:

calling the first thread to store the compressed file to obtain a storage address of the compressed file; and storing the storage address of the compressed file into a second queue, wherein the second queue stores a storage address of the second-type file.

16. The electronic device according to claim 15, wherein the calling the second thread to send the second-type file and the obtained compressed file to the second electronic device comprises:

calling the second thread to read the storage address of the second-type file and the storage address of the obtained compressed file from the second queue;

obtaining data of the second-type file according to the storage address of the second-type file;

obtaining data of the obtained compressed file according to the storage address of the obtained compressed file; and sending the data of the second-type file and the data of the obtained compressed file to the second electronic device.

17. A computer-readable storage medium, wherein the computer-readable storage medium stores a computer program, and the computer program, when executed by a processor, causes the processor to perform a file sharing method, wherein the method is applied to a first electronic device, and comprises:

displaying a first interface comprising an identifier of a second electronic device;

establishing a communication connection to the second electronic device when receiving a first operation that is on the first interface and that is performed by a user on the identifier of the second electronic device, wherein the second electronic device is configured to receive multiple to-be-shared files sent by the first electronic device;

creating a first thread and a second thread;

calling the first thread to sequentially compress a first-type file in the multiple to-be-shared files to obtain a compressed file; and calling the second thread to send a second-type file in the multiple to-be-shared files and the obtained compressed file to the second electronic device through a data channel corresponding to the communication connection, wherein the first-type file and the second-type file are obtained by classifying the multiple to-be-shared files according to a preset classification policy, the first-type file is a file that needs to be compressed, and the second-type file is a file to be directly sent to the second electronic device;

wherein execution by the first thread and the second thread is concurrent.

18. The computer-readable storage medium according to claim 17, wherein the file sharing method further comprises:

storing a storage address of the first-type file into a first queue; and the calling the first thread to sequentially compress the first-type file to obtain the compressed file comprises:

calling the first thread to sequentially read the storage address of the first-type file from the first queue;

obtaining data of the first-type file according to the storage address of the first-type file; and compressing the data of the first-type file to obtain the compressed file.

19. The computer-readable storage medium according to claim 18, wherein the calling the first thread to sequentially read the storage address of the first-type file from the first queue comprises:

calling the first thread to sequentially read storage addresses of a preset quantity of first-type files from the first queue; and correspondingly, the compressing the data of the first-type file to obtain the compressed file comprises:

sequentially compressing data of the preset quantity of first-type files to obtain the compressed file.

20. The computer-readable storage medium according to claim 19, wherein after the compressed file is obtained, the method further comprises:

calling the first thread to store the compressed file to obtain a storage address of the compressed file; and storing the storage address of the compressed file into a second queue, wherein the second queue stores a storage address of the second-type file.

* * * * *